US005920628A

United States Patent [19]
Indeck et al.

[11] Patent Number: 5,920,628
[45] Date of Patent: Jul. 6, 1999

[54] METHOD AND APPARATUS FOR FINGERPRINTING AND AUTHENTICATING VARIOUS MAGNETIC MEDIA

[75] Inventors: Ronald S. Indeck, Olivette; Marcel W. Muller; Robert E. Morley, Jr., both of St. Louis, all of Mo.

[73] Assignee: Washington University, St. Louis, Mo.

[21] Appl. No.: 08/780,772

[22] Filed: Jan. 9, 1997

[51] Int. Cl.[6] .................................................. H04L 9/00
[52] U.S. Cl. ................................................ 380/23; 380/3
[58] Field of Search ................................ 380/3, 4, 23, 25

[56] References Cited

U.S. PATENT DOCUMENTS

| | | |
|---|---|---|
| 3,790,754 | 2/1974 | Black et al. . |
| 3,896,266 | 7/1975 | Waterbury . |
| 4,038,596 | 7/1977 | Lee . |
| 4,806,740 | 2/1989 | Gold et al. . |
| 4,837,426 | 6/1989 | Pease et al. . |
| 4,882,195 | 11/1989 | Butland . |
| 4,906,988 | 3/1990 | Copella . |
| 4,985,614 | 1/1991 | Pease et al. . |
| 5,027,113 | 6/1991 | Bonnaval-Lamothe et al. . |
| 5,159,182 | 10/1992 | Eisele . |
| 5,177,344 | 1/1993 | Pease ........................................... 380/3 |
| 5,191,613 | 3/1993 | Graziano et al. .......................... 380/23 |
| 5,194,289 | 3/1993 | Butland . |
| 5,365,586 | 11/1994 | Indeck et al. ................................ 380/3 |
| 5,408,505 | 4/1995 | Indeck et al. ................................ 380/4 |
| 5,428,683 | 6/1995 | Indeck et al. ................................ 380/3 |
| 5,434,917 | 7/1995 | Naccache et al. .......................... 380/23 |
| 5,546,462 | 8/1996 | Indeck et al. .............................. 380/23 |

FOREIGN PATENT DOCUMENTS

WO94/24638 10/1994 WIPO .
WO96/08012 3/1996 WIPO .

OTHER PUBLICATIONS

*SecurID® Authentication Tokens*, May 13, 1996 http://www.securid.com/ID187.194709 . . . ?SEARCH_TO=securid%7Ccard#SEARCH_TO.

Virtual Manufacturing Is A Painkiller by Erick Schonfeld, *Fortune*, Apr. 29, 1996.

Electric Money by Udo Flohr, *Byte*, Jun. 1996, pp. 74–78, 80, 82, 84.

Smart cards gear up for belated success by Gary Legg. *EDN*, Oct. 24, 1991, pp. 51–58.

Smart–card applications' hidden problems add to designers' challenges by Gary Legg. *EDN*, Mar. 2, 1992, pp. 83–90.

Noise Correlation of Magnetic Thin Film Media by Mian, Indeck and Muller. *Japanese Journal Of Applied Physics*, vol. 30, No. 8B, Aug., 1991, pp. L1483–1485.

(List continued on next page.)

*Primary Examiner*—Salvatore Cangialosi
*Attorney, Agent, or Firm*—Howell & Haferkamp, L.C.

[57] ABSTRACT

A method and apparatus are disclosed for determining the remanent noise in a magnetic medium by, for example, dc saturation of a region thereof and measurement of the remaining dc magnetization. A conventional magnetic recording transducer may be used to determine the remanent noise. Upon determination, the remanent noise may then be digitized and stored on the same magnetic medium, in a database, or both to thereby "fingerprint" the magnetic medium. This "fingerprint" may then be later used to verify and authenticate the magnetic medium as being an original. The magnetic medium may be of a type adapted to record information magnetically or, even more broadly, any magnetic surface or substance that can be sensed through its magnetic field. In such manner, any magnetic medium, or any object having an associated magnetic medium, may be "fingerprinted" including credit cards, computer program diskettes, magneto-optic discs, videotapes, cassette tapes, bank checks, stock certificates, etc. A different or additional portion of the magnetic medium can be selected each time the medium is authenticated. In this manner, different fingerprint data can be used for each authentication procedure for added security, and to avoid the ramifications of possible counterfeiting, on-line interception, electronic eavesdropping, or sharing of access data by unscrupulous users.

44 Claims, 9 Drawing Sheets

OTHER PUBLICATIONS

Determination of a Track's Edge by Differential Power Spectrum by Indeck, Mian and Muller. *Japanese Journal of Applied Physics*, vol. 31, No. 8A, Aug. 1992, pp. L1065–1067.

Spatial Noise Phenomena of Longitudinal Magnetic Recording Media by Hoinville, Indeck and Muller. *IEEE Transactions On Magnetics*, vol. 28, No. 6, Nov. 1992, pp. 3398–3406.

Measurements and Modelling of Noise in DC–Erased Thin–Film Media by Vos, Tanaka and Judy. *IEEE Transactions On Magnetics*, vol. 26, No. 5, Sep. 1990, pp. 2149–2151.

Spatial Structure Of media Noise In Film Disks by Yarmchuk. *IEEE Transactions On Magnetics*, vol. Mag–22, No. 5, Sep. 1986, pp. 877–882.

Noise From Unsaturated DC Erasure And Peak Shift Of Signals In Longitudinal Thin–Film Disk Media by Ohara and Sato. *IEEE Transactions On Magnetics*, vol. Mag–23, No. 5, Sep. 1987, pp. 2380–2382.

Novel Applications of Cryptography in Digital Communications by Omura. *IEEE Communications Magazine*, May 1990, pp. 21–29.

A Physically Based Approach to Information Theory for Thin Film Magnetic Recording by O'Sullivan, Porter, Indeck and Muller. *Proceedings of the Thirtieth Allerton Conference on Communication, Control, And Computing*, Oct. 1992.

Transverse Correlation Length in Thin Film Media by Mian, Indeck and Muller. *IEEE Transactions On Magnetics*, vol. 28, No. 5, Sep. 1992, pp. 2733–2735.

A Magnetoresistive Gradiometer by Indeck, Judy and Iwasaki. *IEEE Transactions On Magnetics*, vol. 24, No. 6, Nov. 1988, pp. 2617–2619.

An Analysis Of Multilayered Thin–Film Magnetic Field Gradiometers Having A Superconducting Spacer by Indeck. *Journal Of The Magnetics Society Of Japan*, vol. 13, Supplement, No. S1, 1989, pp. 599–604.

Interaction Factors Of A Multi–Layered Magnetic Thin Film System by Mian and Indeck. *IEEE Transactions On Magnetics*, vol. 26, No. 5, Sep. 1990, pp. 2415–2417.

An interaction matrix for the energy analysis of an n–layered magnetic thin–film system by Mian and Indeck. *Journal of Magnetics and Magnetic Materials* 96 (1991) pp. 248–260.

dc track edge interactions by Indeck, Reising, Hoinville and Muller. *Journal of Applied Physics*, 69(8), Apr. 15, 1991, pp. 4721–4723.

Track edge fluctuations by Muller and Indeck. *Journal of Applied Physics*, 67(9), May 1, 1990, pp. 4683–4685.

In Situ Measurement Of The Remanence Curve Of Magnetic Recording Media by Hoinville, Ornes, Murdock and Muller. *IEEE Transactions On Magnetics*, vol. 24, No. 6, Nov. 1988, pp. 2976–2978.

An in situ measurement of intergranular coupling in magnetic film media by Mian, Indeck and Muller. *Journal of Applied Physics*, 73(4), Feb. 15, 1993, pp. 2027, 2028.

Noise Characterization Of Perpendicular Media by Indeck, Johnson, Mian, Hoinville and Muller. *Journal of the Magnetics Society of Japan*, vol. 15 Supplement, No. S2 (1991), pp. 173–178.

Authentication of Forensic Audio Recordings by Koenig. *J. Audio Eng. Soc.*, vol. 38, No. 1/2, Jan./Feb. 1990, pp. 3–33.

MAGNETIC FINGERPRINT

SKEW

METHOD AND APPARATUS FOR
FINGERPRINTING AND AUTHENTICATING
VARIOUS MAGNETIC MEDIA

BACKGROUND AND SUMMARY OF THE INVENTION

The sources of noise in a readback signal from a magnetic recording medium have been investigated and identified. As disclosed in U.S. Pat. No. 5,546,462, the disclosure of which is incorporated herein by reference, one of those sources includes the irregularities and defects in the microstructure of the magnetic medium itself. For many years, the noise generated from this source has been thought, as with the noise generated from other identified sources, to be random and subject only to statistical analysis for its determination. The inventors hereof have demonstrated that this noise component is instead deterministic, i.e., permanent and repeatable, depending entirely on the head-medium position and on the magnetic history of the medium. As confirmed by experiments conducted by the inventors hereof, when the medium has had no signal written on it and has been exposed only to dc fields, the observed readback signals are almost identical. The magnetic contribution to the readback signal under these conditions results from spatial variations in the medium's magnetization: magnetic domains, ripple, local fluctuations of the anisotropy field and saturation magnetization. These local properties, in turn, are affected by the morphology and magnetic properties of the individual grains which make up the domain and which do not change after deposition. Hence, the noise from a nominally uniformly magnetized region measured at a fixed position on a magnetic medium is reproducible. As shown by the inventors hereof, a magnetic medium may be dc saturated and then read to determine its remanent state or remanent noise. The inventors have confirmed that this remanent noise is a function of the magnetic microstructure by comparing the remanent noise after a positive dc saturation with the remanent noise after a negative dc saturation. It has been found that these waveforms are virtual "mirror images" of each other thereby demonstrating a close correlation. Similarly, other methodologies were used to confirm that the remanent noise was deterministic, repeatable, and related to the physical microstructure of the magnetic medium itself. Remanent noise arising from the permanent microstructure exhibits identifiable features characteristic of that permanent microstructure after practically any magnetic history. See *Spatial Noise Phenomena of Longitudinal Magnetic Recording Media* by Hoinville, Indeck and Muller, *IEEE Transactions on Magnetics*, Volume 28, No. 6, November 1992, the disclosure of which is incorporated herein by reference.

There is a long felt need in the art for a method and apparatus to reliably identify or fingerprint various kinds of objects including the wide variety of prerecorded magnetic media presently marketed and/or distributed in the United States and throughout the world. Examples of these magnetic media include those produced and sold in the entertainment industry including magnetic and magneto-optic discs and tapes, cassette tapes, reel to reel tapes, videotapes, etc. Still another major market in prerecorded magnetic media is the tremendous volume of computer programs routinely sold and/or distributed on floppy diskettes and digital tapes. Magnetic media are also used for other purposes for which it is important to be able to identify and authenticate originals including videotapes, cassette tapes, and other prerecordings on magnetic media including tapings of telephone conversations, video recordings of criminal activities, and other such investigative and documentary uses. Still another example of a need in the art for authentication and verification of prerecorded magnetic media lies in the magnetic data card field. Examples of magnetic data cards include the well-known credit card as well as ATM cards, debit cards, security or ID cards, mass transit cards, telephone cards, and even airline tickets or other vouchers which have magnetic stripes thereon for the magnetic recording of data. As well-known in the art, virtually every magnetic data card has a magnetic stripe of prerecorded magnetic data which is used to record the customer's account number or other such identifying data. Tremendous sums of money are lost annually through forgery and other fraudulent copying and use schemes which could be virtually eliminated if an apparatus and methodology could be implemented for reliably authenticating and verifying the identity of a magnetic data card prior to it being approved for its associated transaction.

Prerecorded magnetic media are but one of a variety of objects for which reliable identification or fingerprinting is needed. Tremendous sums of money are also lost annually to forgery or fraudulent copying and use of paper documents such as checks, bank drafts, money orders, and other negotiable or non-negotiable financial instruments including bonds, stock certificates, etc. If these various types of paper documents could be authenticated as they are processed through the financial markets, forgeries thereof could be detected before a particular transaction was cleared.

The explosive growth of the Internet and other computer networks and databases have also resulted in yet another area where reliable verification or authentication is needed. Typically, reusable passwords are assigned to authorized users and access to the network is conditioned upon whether the user can provide the assigned reusable password. This methodology, however, has at least two significant drawbacks. First, because the network provides access to any user who can provide the password for a corresponding account number, unscrupulous users can share a single account and password, often to the pecuniary detriment of the network. For example, one user might pay a flat monthly fee for accessing the Internet, and then share the assigned account number and password with others such that multiple users are accessing the Internet when only a single fee has been paid. This type of fraudulent access is often difficult if not impossible to detect except in egregious cases such as where twenty-five hours are logged to a single account in one day.

Another drawback to reusable passwords for both on-line and off-line computer networks and databases stems from the increasing incidence of on-line interception and electronic eavesdropping. For example, where a computer network or database contains proprietary or otherwise secret information, a user's account number and corresponding password can be intercepted as they are provided by the user to the network. The intercepted account number and password can then be subsequently used to access the network and thereby defeat the security provided by the reusable password. Similarly, where a user is charged based on how long or often the user accesses the network, interception and use of the reusable password by third parties can lead to charges to the user for unauthorized use by others. Thus, a method and apparatus is needed which can thwart both sharing and unauthorized use of legitimate network and database accounts.

Along this same line, computer hardware and software manufacturers need a means for reliably identifying purchasers who seek technical support from the manufacturer. Oftentimes, manufacturers condition access to technical support, which is usually provided by phone, on the customer's ability to provide information specific to the purchased hardware or software for which technical support is needed. For example, software manufacturers routinely query callers for the serial number placed on a floppy diskette and perhaps for the name of the registered purchaser before technical support is given. However, this information can be shared by the purchaser with others, and is oftentimes shared with everyone on the Internet. As a result, manufacturers often provide technical support to persons who pirated the software without any payment to the manufacturer for the pirated software or for the technical support rendered.

Still another need for reliable and remote identification stems from the increasing use of on-line computer networks for conducting business transactions. More and more information as well as products are being sold on-line, such as through the Internet, and many customers seek to pay for these transactions with credit cards. However, on-line use of credit cards requires the purchaser to transmit credit card information such as the account number to the seller, and there is a serious risk to the purchaser that the credit card information will be intercepted and fraudulently used by others. A related concern for the on-line seller is that the provided credit card information might be stolen, as the seller usually has no way to remotely verify that the purchaser physically possesses the credit card corresponding to the provided credit card information.

The inventors hereof are aware of some specific efforts directed at verifying or authenticating various objects. As related in an article entitled *Novel Applications of Cryptography in Digital Communications* by Omura, *IEEE Communications Magazine*, May 1990, a technique is disclosed for authenticating paper documents. As described therein, the basic idea is to measure some unique "fingerprint" of the paper and to sign (encrypt) it using the secret key of the manufacturer of, for example, a stock certificate. The fingerprint is obtained by moving a narrow intense light beam along a line on the paper and measuring the light intensity that passes through the paper. The light intensity function determined by the unique random pattern of paper fibers along the line forms the fingerprint of the particular piece of paper. This fingerprint is then digitized and encrypted by the secret encryption function. The encrypted fingerprint is then separately printed onto the paper in digital form such as a bar code. At a later date, the authenticity of the stock certificate may be verified by using a non-secret public decryption function to decrypt the encrypted data on the paper and reconstruct the intensity function, or fingerprint, that was recorded thereon. Next, the actual intensity function of the stock certificate is measured. If this newly measured intensity function agrees with the intensity function reconstructed from the encrypted data, the document may be declared authentic. This scheme takes advantage of a well-known secrecy system referred to as a public key cryptosystem. This system employs a trap door one-way function. A user chooses a secret key (the trap door) and after applying the trap door one-way function to the data, the procedure determines an algorithm used for decoding which is made publicly known. The trap door one-way function is also used to produce the encrypted message. Then every other user can understand the original message by applying the algorithm to the cryptogram. In this system no one else can produce a publicly readable message attributable to the originator's trap door as only the originator has knowledge of that algorithm. This prevents the simplistic forgery attempt of changing the prerecorded fingerprint to agree with a forged document's fingerprint.

Another example of an attempt in the prior art to fingerprint or counterfeit-proof objects is described in U.S. Pat. No. 4,806,740. As shown therein, an object, such as a stock certificate, has deposited thereon a stripe of magnetic medium having a variable density resulting from the non-uniformity of the paper, the process of depositing the magnetic medium on the document, and the dispersion of magnetic particles within the medium. The density variations are randomly created as the magnetic medium is applied, which affords a unique document as these density variations are fixed and repeatable to identify the document. A second magnetic stripe is also applied to the document, but this magnetic stripe is comprised of a medium that is tightly specified and highly controlled in accordance with well-known standards in the recording art to be part of a magnetic read/write system. In operation, the non-uniform magnetic stripe is erased and recorded on with a standard recording comprised of a linear dc signal or a linear ac signal or a linear bias signal. After recording, another head senses the magnetic characteristic of the recorded magnetic stripe which is translated into a digital, machine readable format, and then separately recorded on the second magnetic stripe in a simple write function. For authentication, the stock certificate is passed under another set of heads which first reads the digitally recorded machine readable representation of the sensed noise signal and then a second set of heads reads the variable density magnetic stripe by first erasing it, recording the same standard noise function, and then sensing the output of the recorded noise function as it is "distorted" by the variable density magnetic stripe. If it matches the recorded representation thereof, then the document is declared to be authentic and original. Thus, with the method of the '740 patent, a pair of magnetic stripes must be applied to the document and a specified signal (denominated as noise) must be recorded, measured, and then its output digitally recorded. Furthermore, one of the magnetic stripes must be applied in other than recording industry standard and in a random manner to ensure the randomness of the output thereof. These steps make the method of the '740 patent difficult and inconvenient to implement.

Another example of a prior art attempt to utilize a magnetic medium for authenticating credit cards, documents, and the like is found in Pease et al., U.S. Pat. No. 4,985,614. The '614 patent is actually quite similar in concept to the '740 patent discussed above in that it focuses on the macroscopic, hereinafter denoted "macro" variations in a magnetic medium, and their effect on an "enhancing" signal recorded thereon in one embodiment or standing alone in a second embodiment. With either embodiment, these "macro" variations are determined by reading a chosen length of approximately 2.6 inches of a magnetic stripe between three and nine times (five in the preferred embodiment) and then correlating the collected data points to "average out" the effects of head noise, electrical noise, and any other non-medium noise. This correlation results in a "representative profile" which represents the variances which would be induced by these macro effects to a signal if it were recorded on this 2.6 inch portion of magnetic stripe. If these variations are not significant enough to produce a reliable correlation, indicating a lack of significant macroscopic nonuniformities in the medium, the medium is discarded. This is an indication that the medium has been manufactured with too little variation from specification, or otherwise does not have enough macro level variation which might be present due to a manufacturer's watermark or the like, to induce reliably detectable and repeatable variations to a recorded signal. The '614 patent also suggests that macro level noise may be enhanced by locally altering the apparent magnetic characteristics of the stripe such as by placing magnetic symbols on the substrate underlying the magnetic region, or by embossing selected regions of the magnetic material so as to physically move some amount of the material. As the noise levels measured have significant effects on the peaks of a recorded enhancing signal, a simple peak detect and hold circuit is taught as sufficient to collect the data, and a simple "comparison" of the prerecorded "representative profile" with the presently sensed data points is taught as sufficient to determine if the medium is authentic. Therefore, not only does the '614 patent focus on the use of macro level noise, its device and methodology disclosed for implementing a macro level noise detector is believed to be incapable of reliably creating a microstructure noise level fingerprint and validating its existence at a later time in order to authenticate an original.

A device is also known for verifying a user's identity before granting access to a computer system or network. The device includes a "token" issued to an authorized user of the network, and a corresponding "access control module" that resides with a network host, operating system, or other communications device. Both the token and the access control module generate unique, one-time "unpredictable" access codes every sixty seconds. To gain access to the network, a user must enter the current code displayed on the token. If the entered code matches the code generated at that same moment by the corresponding access control module, network access is granted. In this manner, the identity of the user can be remotely verified by verifying that the user possesses the token at the time access is requested. The significant drawbacks to this system are that the network must acquire, i.e., purchase, an access control module and a token for every authorized user, and the authorized users must then carry the tokens in addition to the numerous other magnetic data and identification cards carried by the average individual. Additionally, because each token and its corresponding access control module generate the same exact code every sixty seconds, this implies that a predetermined algorithm is used, and further implies that "cracking" the algorithm is not beyond the realm of possibility. Furthermore, because the token carried by the authorized user utilizes electronics and a screen for generating and displaying the access codes, reliable operation of the token depends upon battery power.

In order to solve these and other problems in the prior art, the inventors hereof have developed a method and apparatus for utilizing the unique, deterministic, remanent noise characteristic of a magnetic medium, due to its magnetic microstructure, to fingerprint not only documents, but other objects and more importantly, the magnetic medium itself so that it can be identified and authenticated. This inventive technique relies upon the discovery that the microscopic structure of the magnetic medium itself is a permanent random arrangement of microfeatures and therefore deterministic. In other words, once fabricated, the recording medium's physical microstructure remains fixed for all conventional recording processes. In particulate media, the position and orientation of each particle does not change within the binder for any application of magnetic field; in thin film media, the microcrystalline orientations and grain boundaries of the film remain stationary during the record and reproduce processes. It is the magnetization within each of these fixed microfeatures that can be rotated or modified to form the basis of the magnetic recording process. If a region of a magnetic medium is saturated in one direction by a large applied field, the remanent magnetization depends strongly on the microstructure of the medium. This remanent state is deterministic for any point on the magnetic medium. Each particle or grain in the medium is hundreds to thousands of Angstroms in dimension. Due to their small size, a small region of the magnetic surface will contain a very large number of these physical entities. While the fabrication process normally includes efforts to align these particles, there is always some dispersion of individual orientations and positions. The actual deviations will be unique to any region of the medium's surface making this orientation a signature or a "fingerprint" of that medium. To reproduce this distribution, intentionally or not, is practically impossible since this would entail a precise manipulation of the orientation of numerous particles at the submicron level. Thus, the orientation of a large set of particles on a specific portion of a magnetic surface can uniquely identify that medium. In experiments, the inventors have found that the remanent noise from a length of between about 30 micrometers and 4300 micrometers presently provides enough data to "fingerprint" a magnetic medium. This may be contrasted with the 66,040 micrometers (2.6 inches) of length required in the method of the '614 patent discussed above to fingerprint a magnetic medium using macro noise.

In essence, the present invention is elegantly simple and adapted for implementation by conventional magnetic transducers as are commonly found and used in virtually every read or read/write device presently utilized by the public at large. Such examples include credit card readers, magneto-optic disc players, cassette players, VCRs and personal computers. Furthermore, an inexpensive card reader may be coupled with virtually any device or process, and the card reader used as a "gatekeeper" to permit input or access only by those who can present a valid passcard for authentication. The card reader can also be used to facilitate approval of on-line credit card transactions. Because of the relatively small amount of "magnetic medium" which is required to achieve an accurate fingerprinting, the application of the present invention extends well beyond magnetic recording surfaces as discussed above. For example, the magnetic numbers applied to bank checks have sufficient length to provide for accurate "fingerprinting" of each individual check.

In its simplest implementation, a conventional recording head need merely dc saturate a specified portion of a magnetic medium, and then "read" or "play back" the remanent noise which remains. For convenience, the fingerprint may be obtained from a region between two recorded magnetic transitions already in place on the medium. This remanent noise, which is an analog signal, may then be digitized and recorded, on the medium itself or elsewhere, in machine readable format and perhaps using a trap door function depending upon the particular application. Thus, the magnetic medium itself can be "labeled" with its fingerprint. Verification or authentication of that magnetic medium is simply achieved by reversing this process except that in the more security sensitive applications the digitally recorded fingerprint must be decrypted using a publicly known key. Should the measured remanent noise match the remanent noise as recorded, the magnetic medium is authenticated.

There are many variations in utilization of the inventors' method and apparatus which expand its universe of applications. For example, some applications need not require the use of a trap door function such as, for example, when the encoded objects are not publicly distributed and instead are being identified solely for the user's purposes. One such example would be for use with inventory items. Other examples include those applications of magnetic media which are not adapted for the recording of data or information thereon. For example, a bank check includes magnetic numbers along its lower edge which are used to process the bank check at various stages in the check clearing system of the financial world. At any one or more selected points in that system, a fingerprint may be used to verify that the check is valid and is not a forgery. In this application, the bank check may be fingerprinted by the issuing institution as bank checks are given to account holders for their use. This would eliminate the widespread counterfeiting of bank checks using either accurate or inaccurate account holder information imprinted on the check. In this way, commercial banking institutions can ensure that only their imprinted and authorized checks are used by their account holders and are honored through the check clearing system. This application of the inventors' fingerprinting process would eliminate significant amounts of fraud in the commercial banking system.

Utilizing the present fingerprinting invention with other financial instruments would eliminate many other kinds of fraud, forgery and the like with minimal interruption or modification to presently used documentation paradigms through imprinting of account numbers, certificate numbers, and other identifying indicia or data with magnetic ink and the reading thereof as these financial instruments are processed. Stock certificates, bond certificates, bearer bonds, bond coupons, treasury bills, and other financial instruments could be fingerprinted to eliminate their forgery. Reading and verification of the fingerprint is easily achieved at the same time that the magnetic certificate number, account number, ID number, or other numbers on the instrument are read as the instrument is processed through various points in the financial markets. By utilizing the particular numbering already implemented, and readers already implemented, this increased level of protection for authenticity can be achieved with minimal change in the processing machinery. As such, the inventors' apparatus and method are uniquely suited to adaptation in this particular application.

Still another application involves the "copy protection" of mass distributed application software. Over the years, many schemes have been tried and almost uniformly abandoned for copy protecting publicly distributed diskettes of prerecorded software. This has happened for many reasons including the problem that almost all of the copy protection schemes previously implemented interfere with the running of the software on the user's computer. With the present invention, a copy protection scheme may be implemented which does not interfere with the running of the software and instead merely provides a precondition to running of what is otherwise normally written code. In its implementation, a software program may first instruct the computer on which it is run to read a fingerprint of a specified portion of the purchased diskette or tape and compare it with a prerecorded version of the same fingerprint. If the fingerprints match, then the software may permit the computer to further read and implement the application software. However, if the fingerprint detected by the computer does not match that which is stored in the software, then the software itself may inhibit further reading of the program and prevent its implementation. This would absolutely prevent a user from making a copy of a program for use by someone else. This scheme may also be slightly modified to permit a user to make a single archive or backup copy such that the fingerprint comparison permits the first non-matching fingerprint copy to be run but then prevents any other non-matching fingerprinted copies to run. As an added level of protection, the software can have previously determined fingerprints for multiple portions of a diskette stored therein, and can be configured to read and validate a fingerprint from a different region of the diskette each time the software is run. This implementation is easily achieved and "copy protects" application software reliably, inexpensively, and requires only minor hardware changes to the massive number of computers already in consumers' hands.

Still another significant application of the present invention involves authenticating credit cards using the single magnetic stripe already implemented on most major credit cards. Again, this may be contrasted with the '614 patent which suggests that a second stripe be added because of the required 2.6 inches of stripe length which must be dedicated to obtain a single macro fingerprint. The same method would be used as explained above to measure the "fingerprint" for a portion of the magnetic stripe and then record a digitized version of the fingerprint on the magnetic stripe. A credit card reader would then require the prerecorded fingerprint to be matched with a measured fingerprint every time the card is used to verify its authenticity. While there are already a large number of credit cards in circulation, these cards are routinely subject to expiration such that there is a continual replacement of these cards in the public's hands. Thus, over time the installed base of credit cards could be readily transformed to those which have been "fingerprinted." Furthermore, an existing card base may be "fingerprinted" as used to more rapidly implement the "fingerprint" system. This could be done at the next use of each card by each cardholder.

As an alternative or enhancement to this application of the present invention, the fingerprints for an entire region or multiple portions of a magnetic stripe can be determined and stored in a central database. Thereafter, when the consumer seeks to use the credit card on-line, for example, the seller can authenticate the credit card, and verify that the consumer possesses the card, by requesting the fingerprint for a selected portion of the magnetic stripe and comparing it to the previously stored data. Using an inexpensive card reader and perhaps appropriate software, the user can read the remanent noise for the selected portion of the magnetic stripe and transmit this information to the on-line seller for validation. Each time the consumer's credit card is used, a different or additional portion of the card can be selected by the seller or the credit card issuer for authentication purposes. In this manner, the validating fingerprint, which is transmitted from the purchaser to the seller, is changed each time the card is authenticated such that on-line interception and electronic eavesdropping are rendered harmless and ineffective for "stealing" a fingerprint and matching account number. If the transmitted fingerprint is intercepted, it will be useless for virtually all subsequent transactions.

This aspect of the present invention was developed from the inventors' recognition that a large and practically infinite number of fingerprints can be obtained from a magnetic medium of finite length or surface area. For example, in the case of a credit card, a different portion of the magnetic stripe (or a different portion of one of the magnetic stripe's multiple tracks) can be selected each time the card is authenticated to generate a unique fingerprint, where the selected portion may or may not overlap, and may or may not have the same length as a previously selected portion. In addition, multiple portions of the magnetic stripe can be selected and the remanent noises read therefrom, where the remanent noises from the multiple portions are then assembled into a single fingerprint for verification purposes. The remanent noises from multiple portions of the magnetic stripe can also be linearly combined, such as by adding, subtracting, or averaging the multiple remanent noises to generate a hybrid fingerprint that does not represent the remanent noise for any single portion of the magnetic medium. This would prevent an electronic eavesdropper, for example, from collecting over time the remanent noise data for a substantial portion of the magnetic medium. In the case of magnetic data cards, a second magnetic stripe can be applied to the card to further increase the number of available noise codes. By employing any one or a combination of these several methodologies, a seemingly limitless number of fingerprints can be derived from an object's magnetic medium so that a different fingerprint can be used each time the object is authenticated.

Although described above for credit cards, this aspect of the present invention is equally applicable to other applications as discussed more fully below, such as for remote authentication of network users before access to a computer network is granted. If there is any risk that a transmitted password could be intercepted and subsequently used by an unauthorized party, the network can employ one-time, non-reusable noise codes by selecting one or more different portions of a user's magnetic passcard each time the user requests access to the network. In still another application, a computer hardware or software manufacturer can ensure that technical support is only provided to the actual purchasers of the manufacturer's products. For example, before a software manufacturer sells a computer program on a floppy diskette at the retail level, remanent noise data for multiple portions or an entire region of the diskette can be collected and stored. Thereafter, if an alleged purchaser of the software seeks technical support, the software manufacturer can precondition its rendering of support upon the alleged purchaser's ability to, using a computer, read the remanent noise from a portion of the diskette selected by the manufacturer, where the computer can display the remanent noise data for the purchaser to read and report to the manufacturer. This selection can be changed each time technical support is requested to prevent support from being rendered to individuals that pirated the software rather than purchased it.

In still another application, the present invention may be coupled with a data base or processor such as in so-called Smart Cards. These credit card-like devices actually contain, in addition to perhaps the standard credit card magnetic stripe, an on-board electronic memory and/or microprocessor. This memory or microprocessor may contain all sorts of information including money substitute data. For example, at present a large number of these smart cards are in use worldwide as pre-paid telephone cards which are pre-loaded with a monetary amount which is charged against by a pay phone. The cards are used until their pre-loaded monetary equivalent has been depleted and then they are discarded. While various security methodologies have been developed to protect against fraud, they are subject to breach. The present invention is uniquely suited as a security scheme for smart cards as it depends solely on the magnetic microstructure of the particular magnetic medium. In use, the magnetic fingerprint could be stored on the magnetic stripe or in the smart card's on-chip memory. When coupled with a trap door function, no fraudulent card could be created without access to the trap door function and every transaction could be quickly preauthorized at a local card reader, without phoning a central clearing authority.

In an extension to all credit card and smart card applications, the fingerprint data may be stored along with each transaction so that a complete record or trail is created which traces a particular card's history. Thus, the present commonly used scheme where a number of fraudulent cards are created with a correct but stolen account number could either be thwarted or effectively prosecuted. Another level of security incorporates random positioning of a recorded fingerprint on, for example, a magnetic data card. This position might be a function of the card's number. For example, the card number modulo "P" might point the read electronics to a particular data bit around or next to which the recorded, machine readable fingerprint will be found.

As alluded to above, another significant category of applications involves utilizing the present invention in its gatekeeper function. For any system, network, process, machine, location, or other function to which access is desired to be restricted to only those who are authorized, the present invention provides a unique and reliable solution. In its simplest implementation, a passcard may be created with a magnetic stripe which is fingerprinted in accordance with the present invention. Although examples will be discussed in terms of utilizing a passcard, it should be understood that any magnetic medium can be similarly used in accordance with the teachings herein. As such, all other such examples and implementations are intended to be included within the present invention and shall be understood to be included within the term "passcard." This passcard may then become a personal ID card which may be used not only to control access, but to also identify the particular person accessing the service, function, etc. by storing the particular magnetic fingerprint of the card being used. Numerous examples may be readily considered. For example, access to a computer network through a remote terminal may be controlled utilizing a passcard of the present invention. This could be implemented through the use of a diskette that may be readily inserted in any floppy disk drive that could authenticate any one or more of the fingerprints on the diskette. Alternatively, an inexpensive card reader, adapted to read a passcard, could be utilized as well. In either case, different portions of the magnetic stripe could be used each time access is sought, in the same manner as that described above for magnetic data cards, to overcome the security risks of on-line interception and electronic eavesdropping.

Many other applications could utilize the passcard of the preferred embodiment as well. For example, a bank teller may be assigned a passcard which could then be used to track all of the transactions entered by the teller and thereby more reliably guard against teller fraud. The myriad of identification cards utilized by businesses, health plans, universities, hospitals, and other organizations or facilities could readily adopt and use a passcard to more securely identify and preauthorize the users of its services, facilities, etc. Not only would existing uses be readily amenable to replacement with the passcard of the present invention, but other new services and systems could be implemented because of the high degree of security provided by the present invention. This may well lead to the creation of national data bases, national ID cards, and other more universal implementations of credit cards or passcards. This is especially true if a system utilizes not only the magnetic fingerprint of a particular passcard, but also utilizes one or more additional security checks such as a picture ID, a personal identification number (PIN) or password that is perhaps encrypted, a human fingerprint, a hologram (presently imprinted on credit cards), or other such methodology which would thereby render the passcard system virtually impregnable. With such security, individuals may be more willing to turn over such detailed personal, financial, and health information as would make these systems feasible.

While the principal advantages and features of the present invention have been described above, and several examples given, a greater understanding of the invention may be attained by referring to the drawings and the detailed description of the preferred embodiments which follow.

DETAILED DESCRIPTION OF THE PREFERRED EMBODIMENTS

As used herein, the term "magnetic medium" should be understood to refer to any substance, material, surface, or other physical object that may be sensed through its magnetic field, whether that magnetic field be intrinsic or induced. As noted above, there are many classic examples of magnetic media which may be thought of in a narrow sense as those surfaces adapted to receive the encoding of information such as data, music and the like with magnetic, analog or digital data. However, there are other examples which are included within the inventors' definition such as magnetic ink applied to a surface through a spraying or lithographing or other process, photocopying processes which utilize an electro-statically applied magnetic toner, the suspension of metal flakes or other magnetizable particles in various fluids such as paint which may be applied to a surface and which then dries to fixate the metal flakes, and even those materials which have no external flux but which when pulsed, for example, generate an externally sensible field. Understanding this definition for the term "magnetic medium," still other physical examples come to mind including any paper documents which have magnetic ink applied thereto such as checks, bank drafts, money orders, and other negotiable or non-negotiable financial instruments such as bonds, stock certificates, etc.

Figure 1:
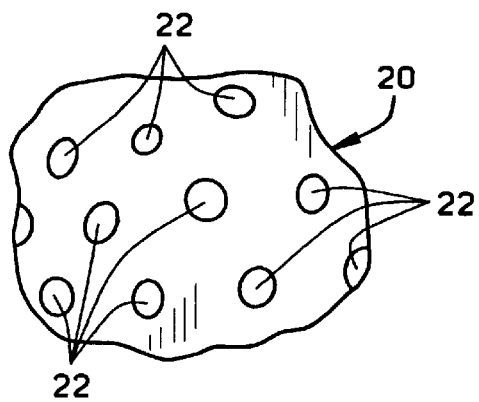
FIG. 1 is a magnified representative depiction of the microscopic structure of a region of magnetic medium.
Figure 2:
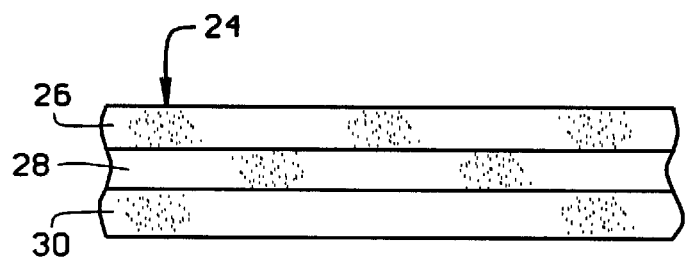
FIG. 2 is a magnified depiction of several tracks of a magnetic medium having microscopic structures representatively shown thereon.

As shown in FIG. 1, a region of magnetic medium 20 is built up with a plurality of microcrystalline structures 22 in a random pattern. Each microcrystalline structure 22 is comprised of particles or grains varying from hundreds to thousands of Angstroms in diameter. The view of FIG. 1 is greatly enlarged and magnified in order to depict these physical microstructures. As shown in FIG. 2, the microcrystalline structures extend throughout the magnetic medium even though the magnetic medium 24 shown in FIG. 2 may itself be comprised of tracks 26, 28, 30 as well-known in the art. Although shown schematically as separate regions, a magnetic fingerprint can be obtained from any portion of the medium 24.

Figure 3:
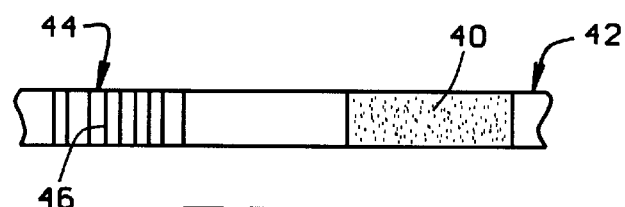
FIG. 3 is a partial view of a track of magnetic media having a fingerprint recorded thereon in machine readable code.
Figure 4:
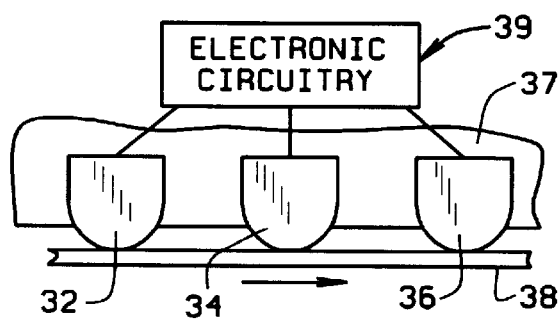
FIG. 4 depicts three conventional transducers connected to associated electronics with a magnetic medium traveling thereunder.

Referring now to FIGS. 3 and 4, a plurality of conventional recording heads 32, 34, 36 are shown mounted in a head transport 37 with a traveling magnetic medium 38 controllably driven past recording heads 32, 34, 36 all as is well-known in the art. These recording heads 32–36 may be any magnetic transducer or magneto-optic transducer head, as known in the art, including transducers having multiple coils for reading multiple tracks. Recording heads 32–36 are all connected to electronic circuitry 39, as well-known in the art, to control and read their input and output and to further process signals for playback or other use. Although only three heads 32, 34, 36 are shown in FIG. 4, it will be well understood to those of ordinary skill in the art that any number may just as easily be provided and, as taught herein, may be required in order to implement the teachings of the present invention. The inventors have also constructed a prototype which demonstrates the operability of one aspect of the invention using a single head. As shown in FIG. 3, the magnetic "fingerprint" at a specified region 40 of a thin film magnetic medium 42, shown representationally in FIG. 3 as a thin film tape, may be recorded at a second position 44 on said thin film magnetic medium 42 in a digitized, machine readable code 46 or the like. Alternatively, the magnetic fingerprint may be recorded on the same portion of the medium from which it was determined, or in an adjacent track.

As their preferred embodiment, the inventors have utilized a methodology for reading or determining the remanent microstructural noise characteristic of a region of a magnetic medium that is being "fingerprinted." Preferably, this region is on the order of several tens to thousands of micrometers. The region is dc saturated and then subjected to a "read" step for determining its remanent noise. While this is the preferred embodiment, it should be understood that the fingerprint is always there, whether the medium has been recorded over or not. Therefore, it is not strictly necessary that the selected portion of medium containing the fingerprint be dc saturated, or dc saturated in the same polarity each time the fingerprint is determined. Instead, it is only important that the remanent noise be determined in a manner which facilitates its being correlated successfully with an earlier determined remanent noise.

If the remanent noise for a specified portion of magnetic medium is obtained in a "single shot" measurement, then the results will include both electronics noise as well as the remanent noise attributable to the particles' orientation. As this "noise" or "remanent noise" is electronically determined as an analog signal, this information may then be digitized and recorded with between about tens to thousands of digital bits of information as may be representationally shown as code 46 in FIG. 3. In experiments, the inventors have made multiple measurements and averaged their results in order to eliminate the electronics noise present in the measured waveform. However, there was observed a high correlation coefficient when the two sets of data, i.e., single shot and averaged, were compared thereby demonstrating that a single shot reading can readily be used in commercial application. The normalized cross correlation coefficient r is used where:

$$r = \frac{\sum_{i=1}^{N}(x_i - \bar{x})(y_i - \bar{y})}{\sqrt{\sum_{i=1}^{N}(x_i - \bar{x})^2 \sum_{i=1}^{N}(y_i - \bar{y})^2}}$$

as explained by the inventors in their earlier published article mentioned above. When authenticating the magnetic medium at a later time, the process is similarly repeated and, when comparing two single shot waveforms, a smaller correlation therebetween was experienced. However, the correlation experienced with two single shot waveforms was significant and clearly demonstrated this method's feasibility for commercial application as well.

Figure 18:
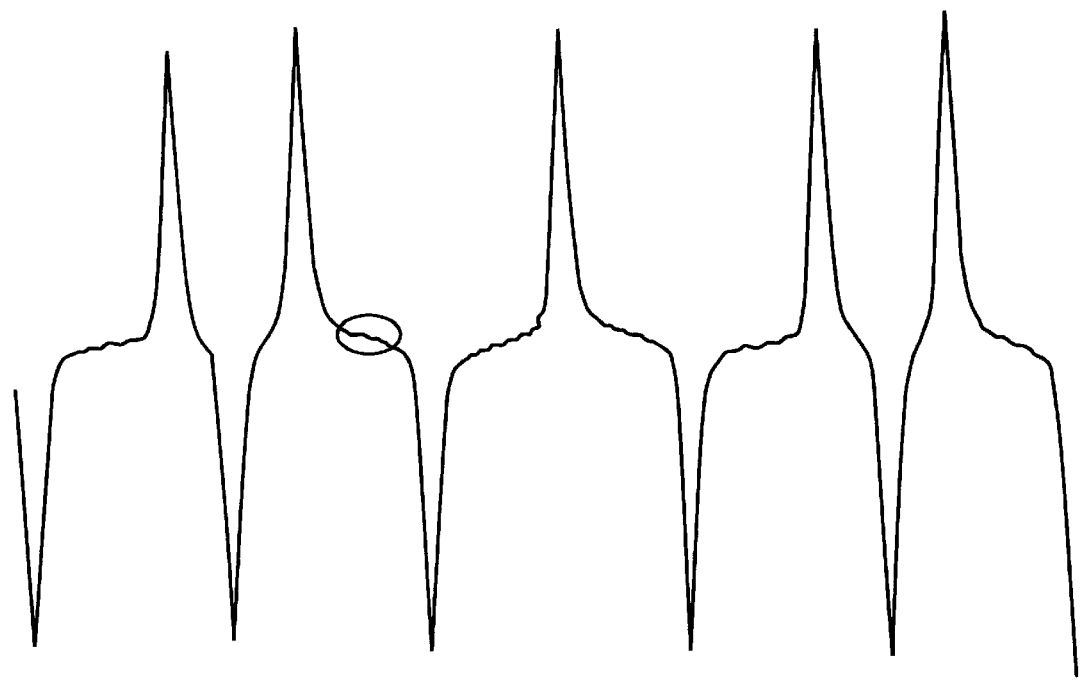
FIG. 18 is a plot from a read of a magnetic credit card stripe.
Figure 19:
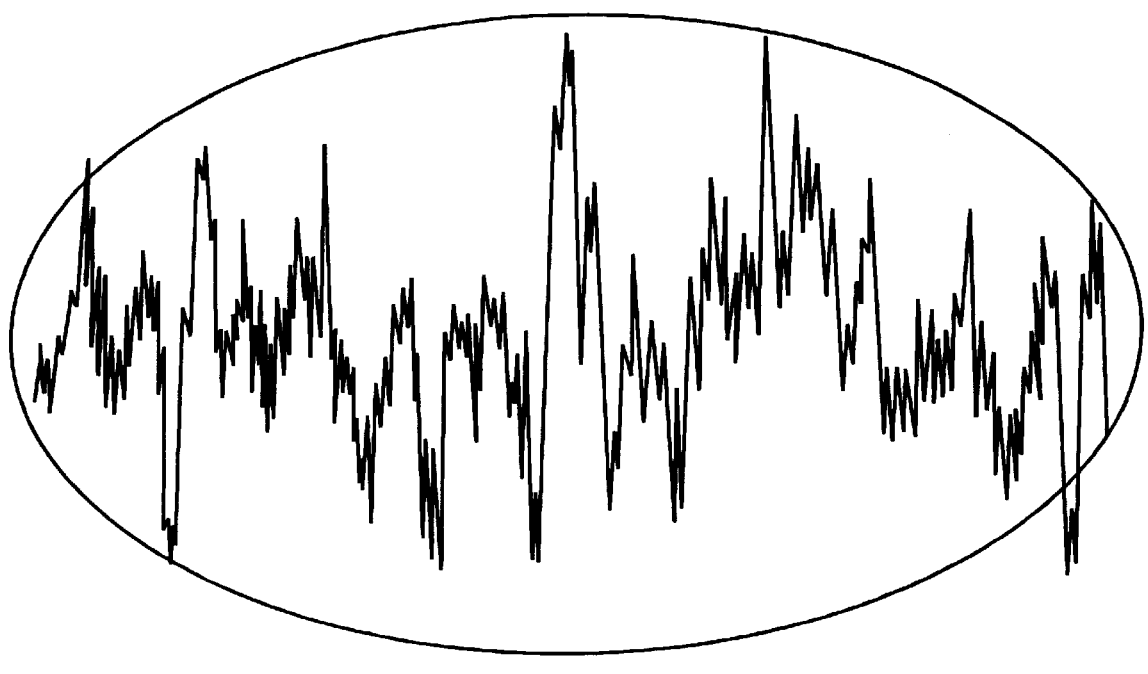
FIG. 19 is an enlarged view of the encircled portion of the waveform in FIG. 18.

FIG. 18 depicts the signal obtained from the read of a magnetic credit card stripe. As shown therein, the portion of the signal used for obtaining a single fingerprint is very small with respect to the rest of the signal. In the inventors' preferred embodiment, between four and eight portions of the readback signal are used for fingerprinting purposes, where each used portion represents zero-bit data. However, it should be understood that more, less, and other portions of the readback signal can also be used for fingerprinting and authentication. As shown in FIG. 19, the encircled portion or fingerprint from FIG. 18 may be amplified to show in greater detail the waveform.

Figure 20:
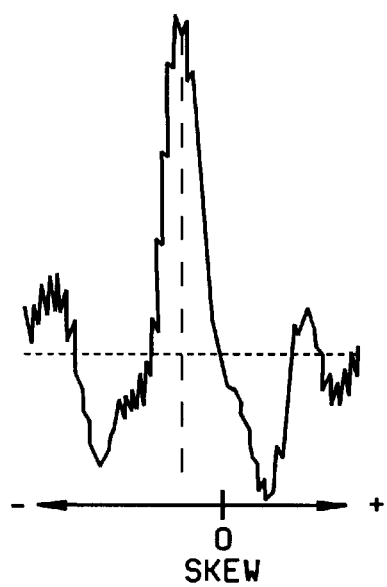
FIG. 20 is a waveform giving the correlation of two readback signals as a function of the relative skew therebetween.

Due to tolerances presently associated with indexing magnetic transducers, there may be some uncertainty as to whether the portion of the medium read when the fingerprint is originally determined is precisely the same portion read when the fingerprint is subsequently determined for comparison purposes. For this reason, the two readback signals may need to be correlated with one another several times, where each time the readback signals are shifted with respect to one another to determine the relative position between the signals which yields the greatest correlation. FIG. 20 illustrates the result of such a process, where a definable "peak" indicates when the correlation is greatest and, hence, when the original and subsequent readback signals are aligned.

Figure 5:
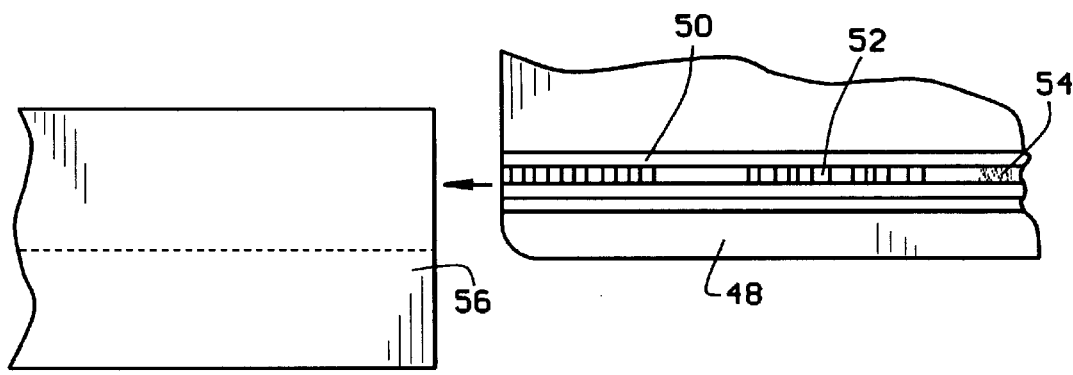
FIG. 5 is a partial view of a credit card having fingerprint data encoded thereon for reading by a credit card reader.
Figure 23:
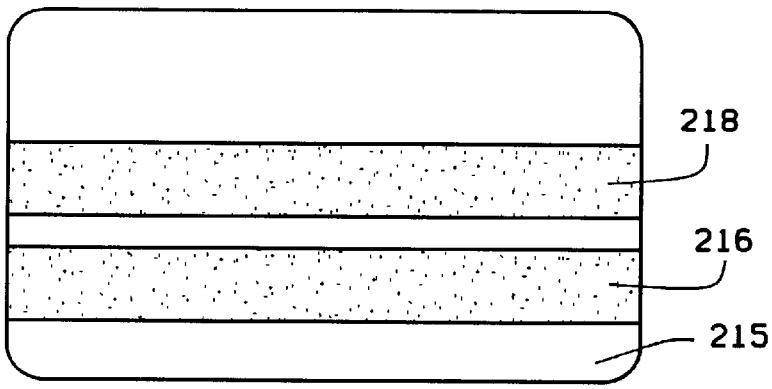
FIG. 23 is a view of a magnetic data card having a second magnetic stripe provided for authenticating the data card.

As shown in FIG. 5, a practical implementation for the subject invention includes a magnetic data card 48 which has a magnetic stripe 50 thereon with magnetic stripe 50 being encoded with a code 52 representative of a fingerprint previously determined for a region 54 of magnetic stripe 50. Thus, as the magnetic data card 48 is "swiped" through a card reader 56, the card reader 56 may read the code 52 and translate it, if necessary, to determine the stored fingerprint data, redetermine the fingerprint at region 54 of the magnetic stripe 50, compare them for a match, and if they match then authenticate magnetic data card 48 as a genuine card which has not been altered and which may be approved. Alternatively, the fingerprint need not be stored on the card but may instead be stored centrally, as in a data base elsewhere. The fingerprint may also be stored on the card as well as in a central database where the fingerprint stored on the card can be used for immediate, point-of-processing authentication of the card, while fingerprint data stored in the central database can be used to remotely authenticate the card, as discussed more fully below. Further still, remanent noise data for multiple portions of the magnetic stripe, or for an entire region of the stripe, can be stored in a database to facilitate remote authentication. Each time the card is authenticated, a different portion of the magnetic stripe can be read for comparison with the stored fingerprint data. In this embodiment, the data card may be provided with a second magnetic stripe for obtaining fingerprint data, as shown in FIG. 23.

Figure 10:
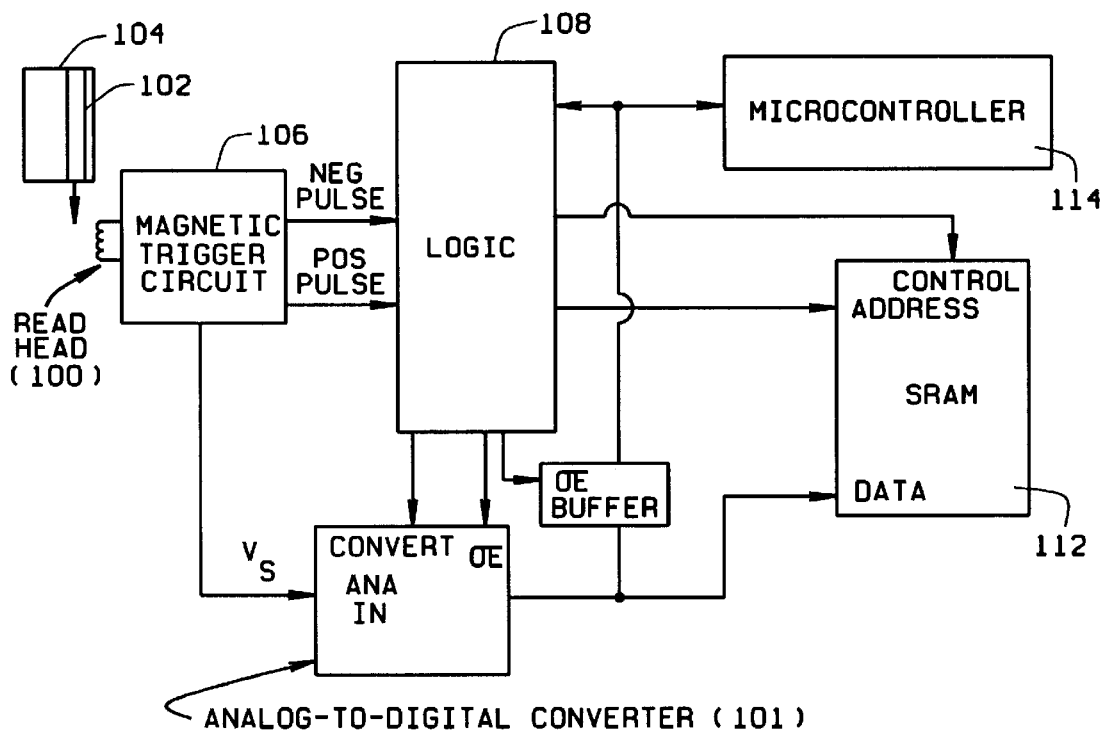
FIG. 10 is a block diagram of a magnetic fingerprint verification circuit.
Figure 11:
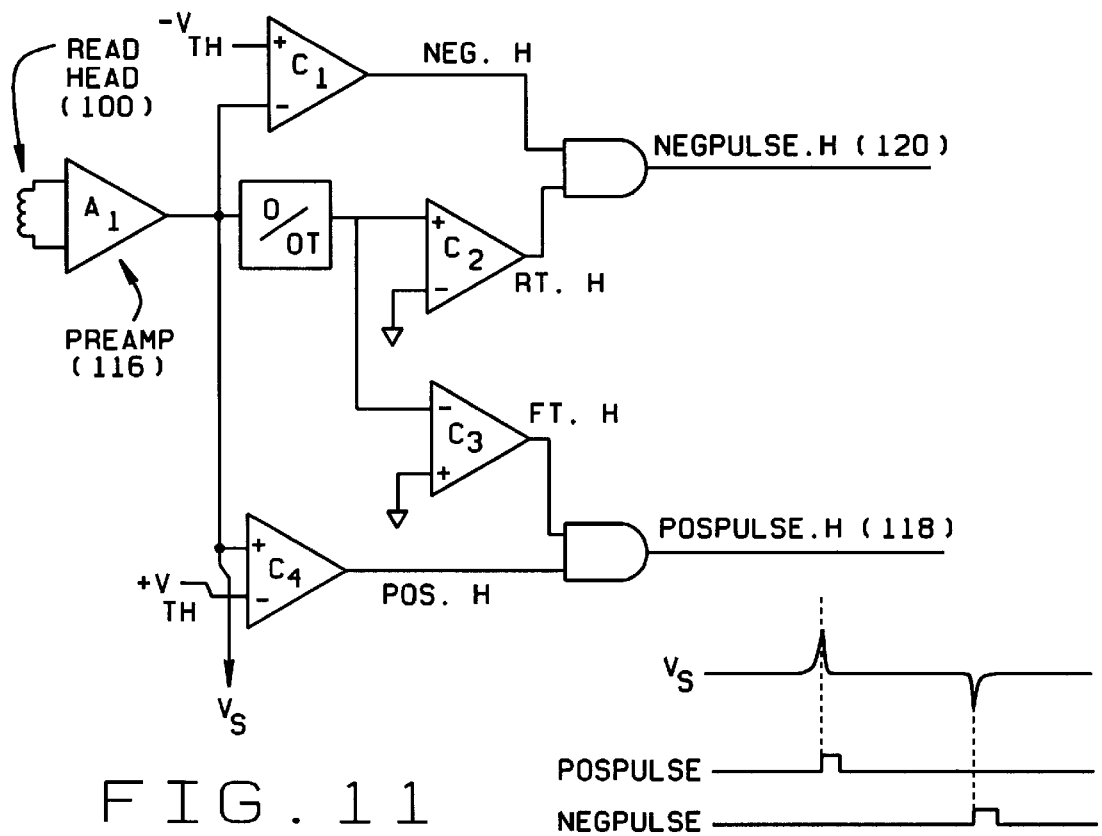
FIG. 11 is a block diagram of a portion of the magnetic trigger circuit shown in FIG. 10.
Figure 12:
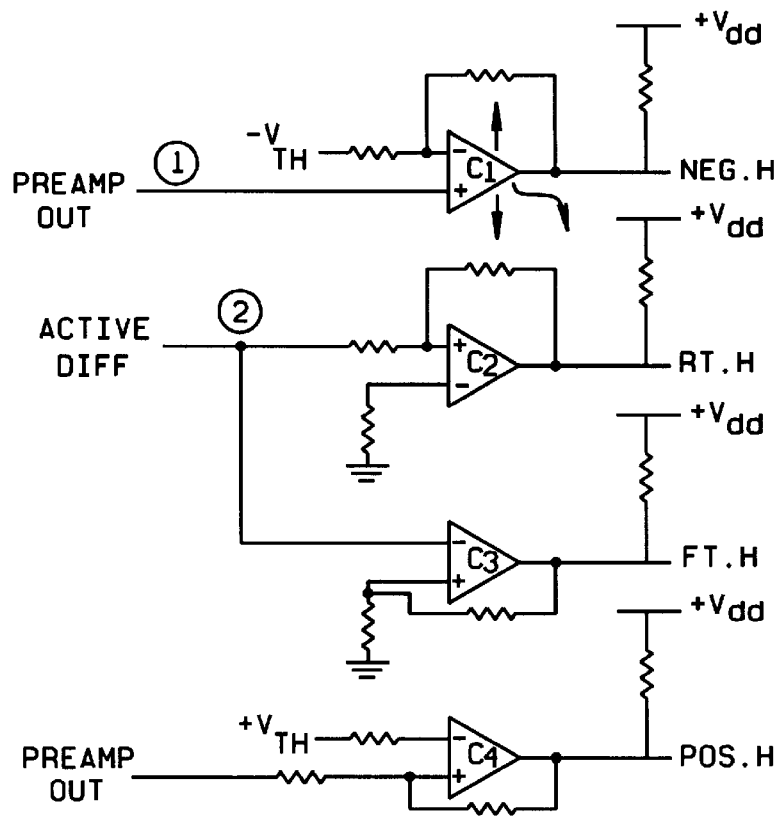
FIG. 12 is a schematic diagram of the comparators utilized in the magnetic trigger circuit of FIG. 11.
Figure 13:
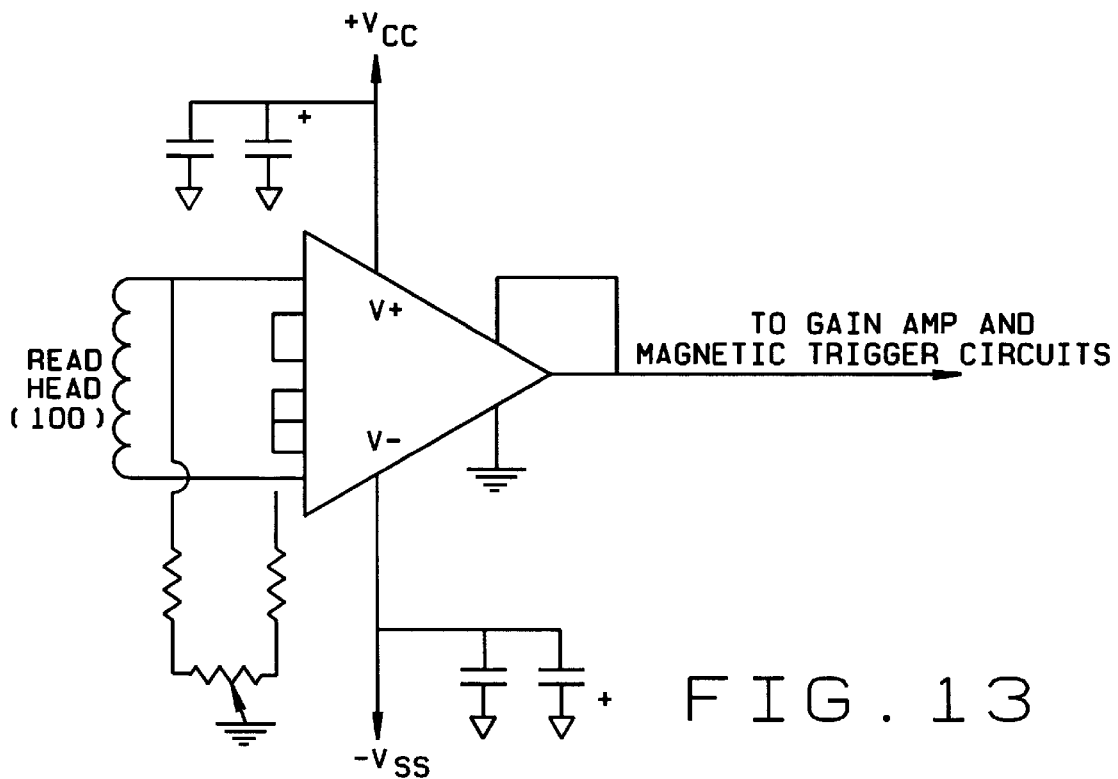
FIG. 13 is a schematic diagram of the preamp circuit utilized in the implementation of FIG. 11.
Figure 14:
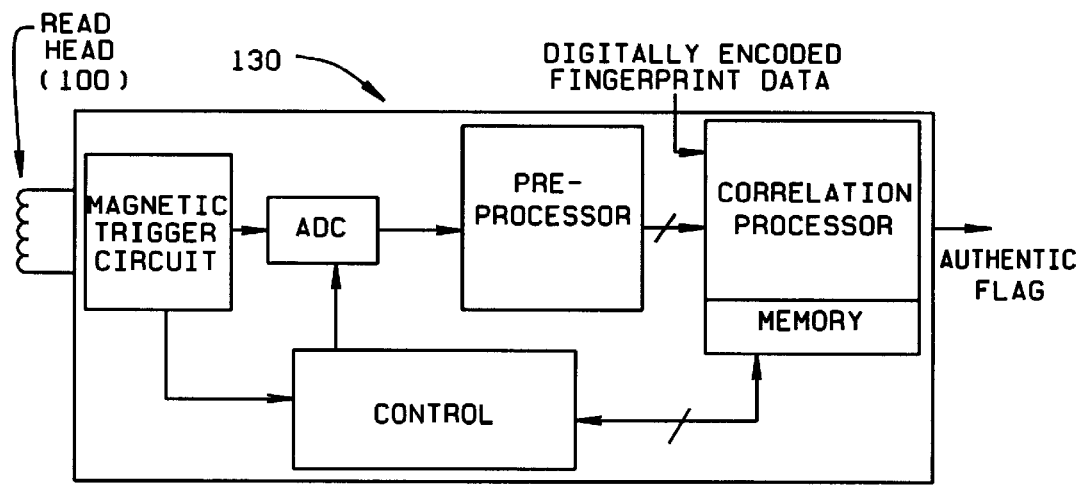
FIG. 14 is a block diagram of a magnetic fingerprint verification circuit set up for implementation in an integrated circuit.
Figure 16:
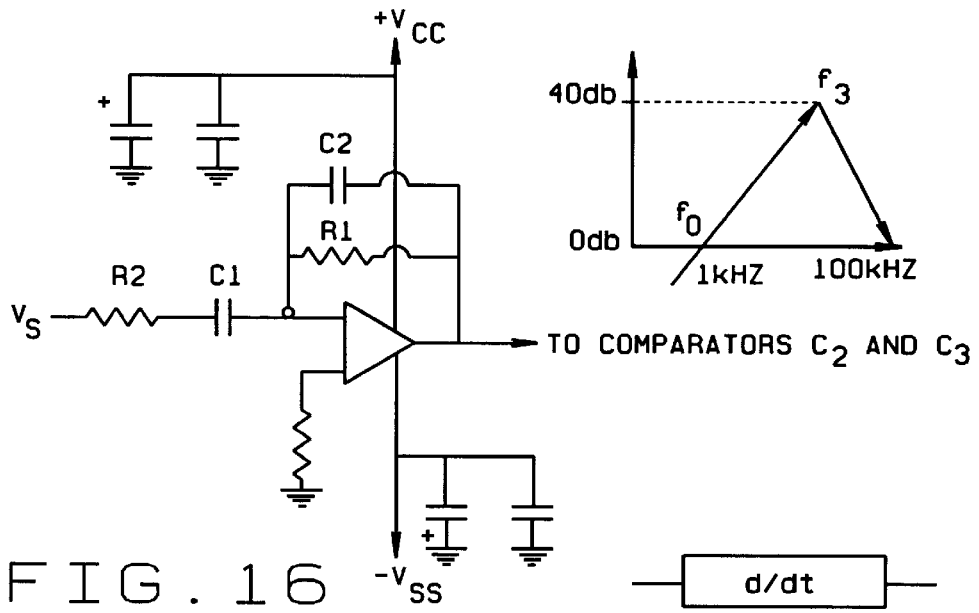
FIG. 16 is a schematic diagram of an active differentiator.
Figure 17:
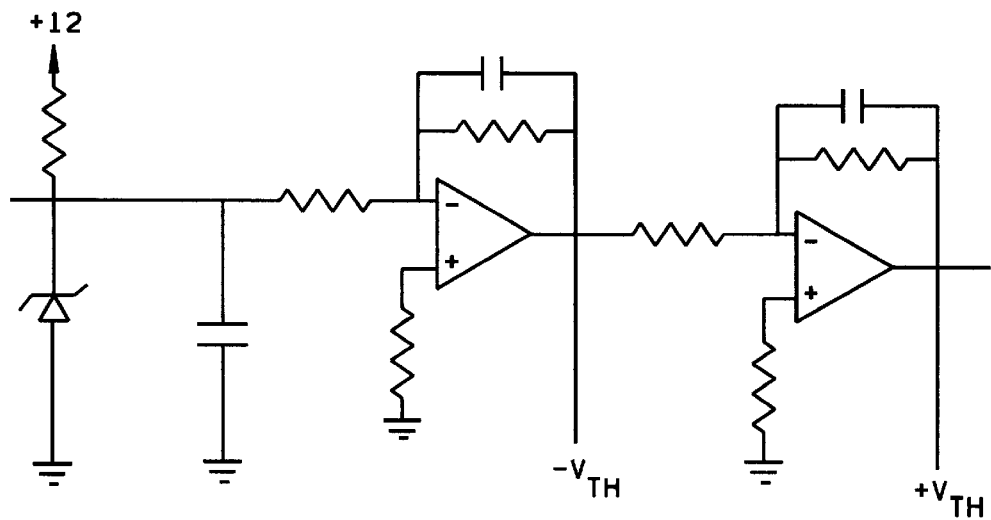
FIG. 17 is a schematic diagram of the threshold generator.

As shown in FIG. 10, a schematic block diagram for a magnetic fingerprint authenticating device includes a read head 100 for reading the magnetic medium 102 which may be on a credit card or passcard 104 as previously described. A magnetic trigger circuit 106 pulses on a logic element 108 which enables memory 112 to store digital data produced by an analog to digital converter 101 from the stream of data $V_s$ from the read head. A microcontroller 114 then processes the data and compares it with the previously determined fingerprint in order to authenticate the credit card or passcard 104. A portion of the magnetic trigger circuit 106 is shown in greater detail in FIG. 11. It includes a preamp 116 (shown in greater detail in FIG. 13) which amplifies the output from read head 100 to produce, through an active differentiator (shown in FIG. 16), and through a set of analog comparators (see FIG. 12) with thresholds produced by a threshold generator (see FIG. 17), a positive pulse output 118 and a negative pulse output 120, as shown by the timing graph in the lower half of FIG. 11. A block diagram 130 for a magnetic fingerprint device is shown in FIG. 14 which is arranged for implementation in a custom integrated circuit.

In many of the implementations of the present invention, the speed at which the magnetic medium is propelled past a recording head, card reader, or the like is fixed both when the magnetic fingerprint is first measured and, later, when the magnetic medium is read in order to verify its authenticity. Some examples of this fixed reading speed include the speed at which a floppy disk is rotated in a computer, the speed at which a VCR tape is played, the speed at which an audio or digital cassette tape is played, the motorized reading of an ATM card, the processing of bank checks by automated devices, etc. This is even true for certain credit card applications where motorized card readers have been implemented. However, there are also other applications for which a controlled speed cannot be expected. Perhaps the most prevalent situation known today is the widely used credit card readers which require a retail clerk to "swipe" the card through a reading track. For those situations wherein the speed at which the magnetic medium is read is variable or different from when fingerprint data was first determined, the inventors have developed a number of methodologies to ensure that data corresponding to the previously determined magnetic fingerprints are captured and used in the verification process. This helps eliminate improper rejections of valid credit cards, passcards, and the like. For clarity, these various methodologies will now be explained with respect to a credit card having a magnetic stripe. However, it should be understood that these methodologies are equally applicable to any application wherein the speed at which the magnetic medium is read is variable or otherwise different from the speed at which the fingerprint data was previously determined.

To originally capture the magnetic fingerprint with the authenticating device whose block diagram is shown in FIG. 10, a series of data points, perhaps 150, are taken between two trigger pulses recorded on the magnetic medium. As shown with the magnetic trigger circuit of FIG. 11, the signal "POS PULSE" becomes active when the "center" of a sufficiently large positive going pulse is detected. Similarly, the signal "NEG PULSE" is active when a sufficiently large negative going pulse is detected. The derivative of the incoming signal is taken using the active differentiator shown in FIG. 16 in order to locate the center of the pulse. By locating the center of the pulse, the distance between the center of the pulses which defines the useable fingerprint area is thereby fixed and represents a distance which is reliably ascertainable every time the credit card is swiped through a credit card reader. A level sensitive detection is also performed by comparators $C_1$ and $C_2$, but this is only to help guard against false trigger events. The A/D converter samples at a fixed rate such as $F_{s1}$. Thus, the physical spacing between sampled portions of the medium is delta $x_1$ where delta $x_1$ is equal to $V_1$ (velocity of the credit card) divided by $F_{s1}$ (the sampling rate). If the sampling frequency $F_{s1}$ is a few hundred kilohertz and the velocity of the card is approximately 0.5 m/s, then delta $x_1$ is on the order of one micron. The number of samples taken, P (perhaps 150), is counted and may be recorded on the credit card or elsewhere along with a digital representation of the determined fingerprint. In order to improve reliability, several readings of the magnetic fingerprint may be made and then averaged in order to eliminate the effects of head noise, electronic circuit noise, and any other noise other than the magnetic microstructure noise of the magnetic medium. This completes the process of fingerprinting a credit card.

When the card is in use, and one of its fingerprints is desired to be authenticated, it is necessary to sample the same region of the card's magnetic medium that was sampled at the time of its fingerprinting. Furthermore, the distance between sample points must be the same as it was when the card was fingerprinted and, in our example, this distance is delta $x_1$. Although it is desired for this to be exactly the same, the inventors have found that some variance, up to a few percent, may be acceptable. As indicated above, the sampling interval is determined both by the sampling frequency of the A/D converter and the velocity at which the credit card moves past the read head. For manual card reading applications, the vast majority presently in use, retail store keepers are virtually assured to swipe the cards at different rates through the card readers. One solution for subsequently obtaining samples at the original sample interval is to greatly oversample. This can be done either in software or hardware. In other words, a sampling rate $F_{s2}$ is chosen which is much greater than $F_{s1}$. This creates a new sampling interval delta $x_2$ which produces many more samples, perhaps 100 times more, than were taken in the original fingerprinting process. In other words, instead of 150 samples, 15,000 samples may be taken. This requires that only every Mth sample be utilized in order to provide the same data set. M may be chosen as the ratio of Q/P where P is the number of samples taken between the two triggering pulses at the time of fingerprinting and Q is the number of samples subsequently taken during authentication using an oversampling frequency $F_{s2}$. Since the distance between the trigger pulses does not change, and the sampling rate $F_{s2}$ is known, the velocity of the card as it is swiped at the retail store location may be readily determined. With this oversampling technique, it may be readily shown mathematically that oversampling by a factor of approximately 100 will result in a set of samples having an effective sampling interval at the point of sale which is within 2% of the original sampling interval for velocities that are as much as five times greater than the velocity used when the fingerprint was previously determined. If necessary, an even greater oversampling rate can accommodate even larger velocity ratios.

The work by the inventors when prototyping the present invention indicated that a digital word size as small as three bits for encoding the value of the fingerprint samples may be sufficient to obtain acceptable results using the proposed correlation analysis technique. This small word size suggests that a relatively small custom integrated circuit (IC) may be designed to conduct this correlation. It is well-known in the art (for example, see the literature on sigma-delta conversion) that n-bit words at a rate $r_1$ can be constructed from a one-bit data stream provided that the data rate of the one-bit data stream is significantly higher than the rate $r_1$. See, for example, *An Integrated Binary Correlator Module*, Jespers, et al., *IEEE Journal*, June 1983. In its simplest form, the word length can be increased by one bit for every factor of four in the oversampling rate. Moreover, it is highly likely that in the case of the proposed correlation technique it might not be necessary to construct the n-bit data word. If that is the case, performing the correlations on a onebit data stream is trivial. For the case of one-bit data, and signals with a zero mean (such as with magnetic medium noise), the correlation coefficient r is given by the following expression:

$$r = \sum_{i=0}^{N-1} x_i y_i.$$

Figure 15:
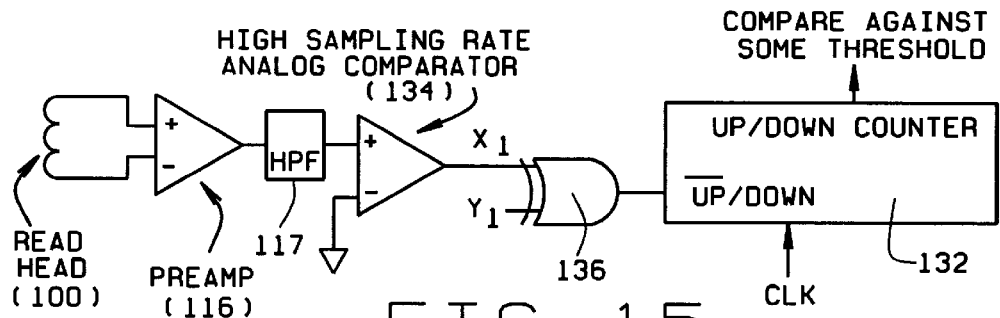
FIG. 15 is a schematic diagram of a correlation circuit for single bit data streams.

Therefore, this correlation analysis can be performed by using a simple up/down counter 132 as shown in FIG. 15. As shown therein, the read head 100 has its output amplified by a preamplifier 116. To ensure a zero mean for the data, a high pass filter (HPF) 117 is provided at the output of the preamplifier 116. The HPF 117 feeds a high sampling rate analog comparator 134 for the $X_1$ input into an XOR logic gate 136. The original fingerprint data, in a one-bit data stream, is provided to the $Y_1$ input in synchronism such that the XOR logic gate 136 output goes low when the bits match and high when they do not. A clock input generated by the logic 108 is provided to the counter for triggering appropriate state changes. The output of the up/down counter 132 is compared against some threshold which, if in excess of the threshold, indicates a match with the original fingerprint.

Just as it is possible to take a one-bit data stream at a high rate and construct an n-bit word at a lower rate, the inverse is also feasible. In other words, at the time of fingerprinting, the magnetic medium can be sampled with a four-bit A/D converter, for example. The fingerprint data can then be stored in four-bit words. During authentication, the four-bit data samples can be translated into a one-bit data stream at the higher rate, such as is implemented in many CD players. This translated one-bit data stream is then correlated with the one-bit data stream emanating from the analog comparator 134.

Still another methodology to ensure the capture of data samples corresponding to those used during the original fingerprinting process involves, essentially, measuring the velocity of the credit card and adjusting the sampling rate to match that velocity. More exactly, two transitions or other fiduciary marks may be placed on the card which are a fixed distance D apart. The time it takes for the card to be pulled from the first transition to the second transition defines the velocity that the card is being pulled through the reader. The sampling rate may then be adjusted to match that velocity which relies on the assumption that the velocity that the card will travel after the second transition will match that traveled between the first and second transitions. This technique does not require any oversampling and therefore minimizes the amount of memory required to store the data samples collected during the verification or authentication process. However, oversampling by a factor of two and then warping or decimating by two has been shown to yield improved performance. In implementing this approach, a phase locked loop may be utilized where the input frequency is divided by a factor M and the feedback loop is divided by a factor N such that N over M times $F_{reference}$ equals $F_s$ (sampling frequency). The factors M and N may be chosen depending upon the other parameters of the system, such as the sample size, expected sampling frequency, distance D, etc. As noted, this technique provides the advantage of eliminating oversampling which reduces the required memory. It does suffer from a disadvantage in that a velocity measurement must be made over a very small physical region, perhaps several hundred microns, which may present accuracy problems.

As mentioned previously, credit card readers which are motorized, or which otherwise standardize the velocity at which the card is pulled through the reader, can be used to minimize this sampling and matching problem. Furthermore, it is possible to combine several of the methodologies to thereby form a hybrid methodology which provides the best results for a particular application. For example, the credit card reader can be designed to match the sampling interval which, as explained above, ideally eliminates the requirement for oversampling. However, oversampling may also be used in conjunction with interval matching to ensure that any variations may be corrected for.

Figure 6:
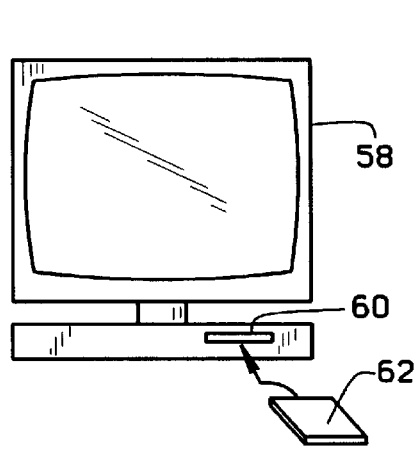
FIG. 6 depicts a personal computer with a computer diskette for insertion in a floppy disk drive thereof.

As shown in FIG. 6, a computer 58 has a floppy disk drive 60 for reading a floppy diskette 62, all as is well-known in the art. As still another implementation of the present invention, a software program recorded on floppy diskette 62 (which may be copied to and run from a memory device within computer 58) may first require that the floppy disk drive 60 read a designated region of the diskette's magnetic medium to determine its fingerprint, compare that fingerprint with fingerprint data stored in the program, and, if they match, permit computer 58 to run the application program. If the floppy diskette 62 is not the original, purchased floppy diskette, then the application program will not run as the measured fingerprint will not match the fingerprint data stored in the program. In a variation of this implementation, a single, archival copy of floppy diskette 62 can be permitted where the program is configured to run if the measured fingerprint is either a match with stored fingerprint data, or is the first non-match. This first non-match fingerprint data would then also be stored in the software program so that the program would subsequently recognize the original floppy diskette 62 or a second floppy diskette that is the backup, archival copy. As an additional level of copy protection, the program can be configured to select, perhaps randomly, a different or additional portion of the diskette's magnetic medium each time the software program is run, provided the program has fingerprint data stored for multiple portions or an entire region of the original diskette's magnetic medium. Similarly, a software program on a digital tape can have remanent noise data stored for one or more portions of the digital tape for subsequent authentication of the tape.

Figure 7:
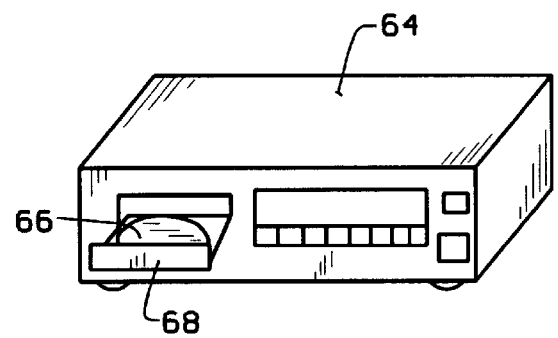
FIG. 7 is a perspective view of a magneto-optic disc player with a magneto-optic disc in its tray.

In still another implementation of the present invention, a magneto-optic disc player 64 has a disc 66 placed in its tray 68 for play upon retraction of tray 68 as shown in FIG. 7. However, disc 66 may have a previously determined fingerprint stored thereon. Should magneto-optic disc player 64 have the appropriate circuitry for preconditioning play of disc 66 upon a positive correlation of the measured and prerecorded fingerprints, unauthorized copying of disc 66 may be prevented. Similarly, any taped copies made from disc 66 would necessarily have the incorrect fingerprint data stored thereon and their subsequent playback would also be prohibited should the tape playback unit have an appropriate circuit for preconditioning play based on matching stored and measured fingerprints.

Figure 8:
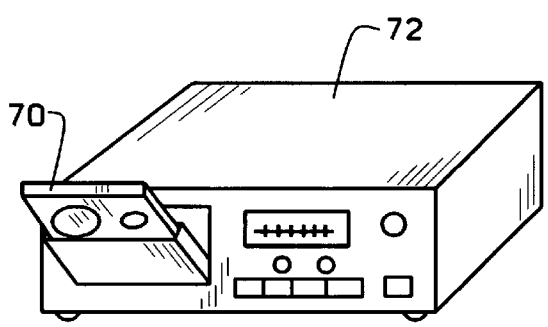
FIG. 8 is a cassette player depicting a cassette tape for play therein.
Figure 9:
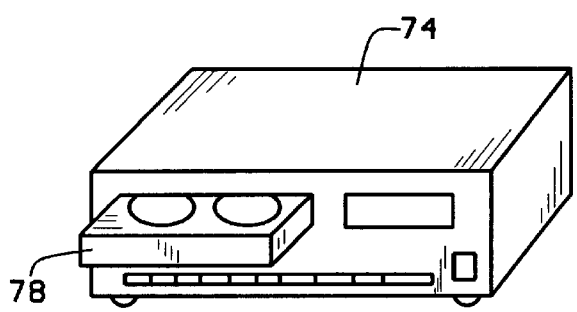
FIG. 9 is a perspective view of a VCR with a tape ready for insertion.

As shown in FIG. 8, still another implementation of the invention includes measuring and storing an appropriate fingerprint on a cassette or digital tape 70, with a cassette tape player 72 having the necessary circuitry for measuring and comparing the prerecorded and measured fingerprints as a precondition to playback, as explained above. In still another implementation of the present invention, as shown in FIG. 9, a VCR 74 has a VCR tape 76 ready for insertion therein. Using the present invention, a fingerprint can readily be measured and encoded on the VCR tape for a subsequent authentication process performed by appropriate circuitry contained within VCR 74. Thus, if appropriately configured, the VCR would not playback a tape unless it was authentic or original.

Figure 21:
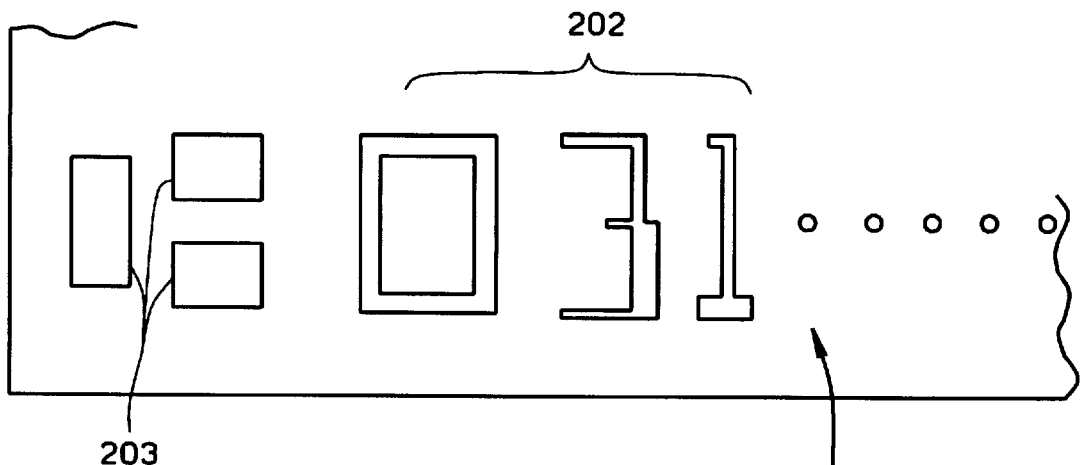
FIG. 21 is an enlarged view of a portion of a financial instrument, such as a bank check, detailing the use of the magnetic ink numbering in the present invention.

As shown in FIG. 21, still another implementation of the present invention includes its use with a magnetic medium that is not adapted for encoding information thereon such as a typical bank check 200 wherein the plurality of magnetic ink numbers 202 along the lower edge of bank check 200 each comprise a "magnetic medium" which may be used for fingerprinting. For example, the fiducial character 203 contains magnetic ink which is sufficiently long to determine a fingerprint therefor. For this purpose, any of the standardized characters at any location can be utilized. Furthermore, in order to accommodate the changing numbers used at the various positions on the bank check 200, an additional digit might even be added solely for authentication purposes. Use of the fiducial character 203 or an additional digit would enable a certain uniformity to be introduced and maintained as the particular data bits vary from bank to bank, checking account to checking account, etc. The digital representation of the measured fingerprint could then be recorded on the bank check for immediate, point-of-processing authentication of the check at various stages in the check clearing system. The digital fingerprint data may also be encrypted or disguised like other data present on the check 200. Alternatively, or additionally, the measured fingerprint data can be stored in a central database for subsequent retrieval during the authentication process.

This same process can be used for other financial instruments including stock certificates, bonds, bond coupons, bearer bonds, money orders, commercial retail establishment gift certificates, etc. These kinds of magnetic media may be generally thought of as non-recording magnetic media in that their principal purpose is other than for the magnetic recording of information thereon. In other words, each decimal number applied with magnetic ink to the lower edge of a bank check is applied in an outline which is itself intended to convey information, i.e., a decimal number. It is not intended that other data be recorded onto these magnetic ink numbers. Instead, the magnetic ink numbers themselves are intended to be read as the check is processed. This may be considered as a subset of the phrase "magnetic medium" that includes recording magnetic media that are intended to have additional information magnetically recorded thereon. Examples of recording magnetic media are given above including magneto-optic discs and tapes, cassette tapes, reel-to-reel tapes, videotapes, computer floppy diskettes, credit card and ATM cards, etc. The inventors envision that their invention may be readily used with all kinds of magnetic media, including both recording and non-recording media as explained herein.

In many of the examples disclosed above, data representing an originally measured fingerprint was recorded on the magnetic medium itself to facilitate point-of-processing authentication of the magnetic medium, i.e., immediate authorization of a credit card physically presented for payment to a retailer. However, point-of-processing authentication can also be performed where this fingerprint data is stored in a central data base rather than on the credit card. Thus, the retailer could access the central data base each time a credit card is physically presented for payment, not unlike other credit card clearance procedures presently performed in widespread fashion using credit card readers.

Still another aspect of the present invention relies on storing original fingerprint data in a remote or central database to provide for on-line use of credit cards and secure access to computer networks, databases, and technical support in a manner which overcomes the former risks of on-line data interception, electronic eavesdropping, and sharing of access data by unscrupulous users. In its simplest implementation, an object such as a magnetic data card or a floppy diskette which comprises, at least in part, a magnetic medium can have remanent noise data determined for multiple portions or an entire region of the medium before the object is issued, sold, or otherwise made available to the public. This remanent noise data can then be stored, for example, in a central database for subsequent retrieval when the object is to be remotely authenticated. Some examples of where remote authentication will be useful include remote authentication of an on-line user's credit card by an on-line service provider, remote authentication of a network user's passcard by the network, and remote authentication of a purchased floppy diskette by a software manufacturer as a prerequisite to rendering technical support.

When an individual desires to access, for example, a computer network, the network can precondition access upon the user's ability to successfully transmit fingerprint data for one or more select portions of a magnetic passcard. In this embodiment, the network will first convey a selection command to the user which indicates a specific portion or portions of the magnetic passcard for which remanent noise is to be determined. The user's computer will then determine the remanent noise for the selected portion of the medium, and will convey a digital or other code representative thereof to the network. Meanwhile, the network will retrieve from a central database previously stored remanent noise data for the selected portion of that user's magnetic passcard. If the fingerprint data provided by the user correlates with the retrieved remanent noise data for the selected portion of the magnetic medium, the magnetic medium will be authenticated and the user's possession thereof will be verified. Accordingly, the user will be granted access to the network.

The next time the user desires to access the network, a similar operation will be performed, but a different or additional portion of the magnetic passcard will most likely be selected by the network for authentication purposes. In other words, a random or non-repeating selection algorithm can be employed for selecting the portion of the magnetic medium used during each authentication process. In this manner, any electronic eavesdropping or on-line data interception of the fingerprint data provided to the network by the user is rendered harmless, as the provided data is guaranteed to be valid for this access attempt only. Should the fingerprint data be intercepted or otherwise obtained by some third party, the third party should be unable to subsequently use the intercepted data to access the network. If such an access attempt is made, the remanent noise for a different or additional portion of the authorized user's magnetic passcard will be requested by the network, and the third party will be incapable of successfully responding to this request.

This approach to remote authentication originates from the inventors' recognition that a very large number of fingerprints can be derived from the remanent noise of a magnetic medium having a finite length or surface area. For example, a large number of fingerprints can be derived from the magnetic stripe of the magnetic data card shown in FIG. 22. Each time the magnetic data card 210 is remotely authenticated, a different portion of the magnetic stripe 212 can be selected. For example, if the magnetic data card 210 is used to access an on-line computer network, the network can select portion "A" of the magnetic stripe 212 for remotely authenticating the magnetic data card 210. If the user provides fingerprint data derived from the remanent noise for portion "A," and this code correlates with previously stored remanent noise data for portion "A" of the magnetic data card 210 as retrieved by the network from a central database, the card will be authenticated and access will be granted. Subsequently, when the user again seeks access to the network, the network will select a different portion of the magnetic stripe 212 for remote authentication purposes, such as portion "C" which is completely distinct from portion "A," or portion "B" which overlaps the previously selected portion "A," or portion "D" which has a smaller read length than portion "A." Additionally, the magnetic stripe may comprise multiple tracks, and the network may randomly select a different portion of one or more of the tracks each time the magnetic data card is remotely authenticated.

Figure 22:
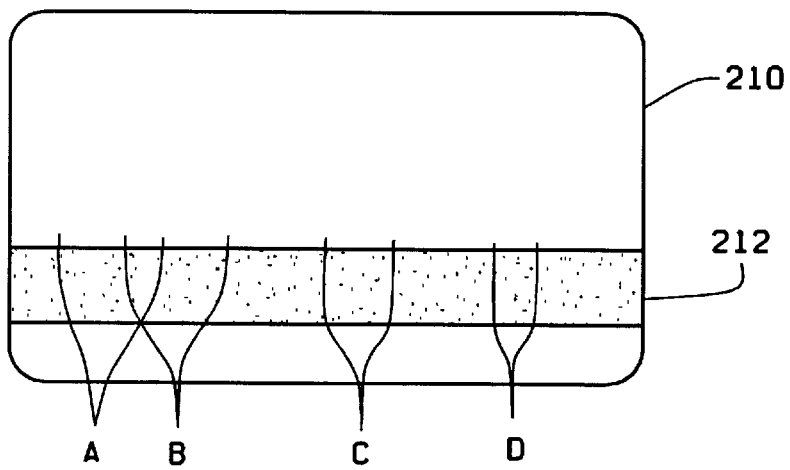
FIG. 22 is a view of a magnetic data card having a magnetic stripe from which a virtually infinite number of fingerprints can be derived.

It should be understood that FIG. 22 is not drawn to scale and, as stated above, the length of the selected portion of the magnetic data stripe need only be between about 30 and 4,300 micrometers in order to successfully correlate the remanent noise measured for the selected portion with a previous determination thereof. Thus, by routinely selecting a different portion of the magnetic stripe 212 each time the magnetic data card 210 is remotely authenticated, where the selected portion may or may not overlap with a previously selected portion, and may have the same, substantially the same, or a significantly different length than a previously selected portion, a large number of fingerprints can be derived from a single magnetic stripe 212, where each fingerprint can represent a one-time, non-reusable passcode for accessing the computer network. In this example, the network can take a random, non-repeating approach to selecting the portion of the magnetic stripe 212 to be used for remote authentication purposes, or any other selection algorithm.

Although selecting a single but different portion of the magnetic stripe 212 each time the magnetic data card 210 is authenticated will provide a sufficiently large number of fingerprints for the majority of applications of this embodiment of the present invention, an even larger number of fingerprints can be generated by assembling fingerprints from the remanent noise data determined for multiple portions of the magnetic stripe 212. For example, the network may challenge the remote user with a selection command requesting the remanent noise data for each of the overlapping portions "A" and "B." In response to this challenge, the remote user's card reader will measure the remanent noise for each portion, and will combine these measured remanent noises into a single fingerprint. The network will then compare this fingerprint provided by the user to a fingerprint assembled from previous determinations of the remanent noises for the selected, overlapping portions "A" and "B." Similarly, multiple nonoverlapping portions, or multiple portions having different read lengths, or even multiple portions having varying lengths, some of which overlap and some of which do not, or any other combination of multiple portions, can be employed for generating additional fingerprints. Thus, it should be understood that more than two and in fact any number of portions of the magnetic stripe 212 can be used for generating fingerprint data, depending only upon the acceptable transmission and/or processing times, and storage requirements, for a given application.

To provide even greater security, a hybrid fingerprint can be derived from multiple portions of the magnetic stripe 212, where digital data representative of the remanent noises measured for the multiple selected portions are linearly combined, such as by adding, subtracting, averaging, etc., so that no single portion of the hybrid fingerprint data bears a resemblance to the remanent noise data obtained from just one selected portion. The hybrid fingerprint will then be transmitted to the network for comparison with the same linear combination of stored remanent noise data for the selected portions.

Although the inventors hereof have developed these various methodologies to derive numerous fingerprints from a magnetic medium of finite length or surface area, it should be understood that the teachings of the present invention can also be implemented by using a very small number of fingerprints for authentication purposes. For example, if a computer network alternately requests remanent noise data from one of only two portions of a user's magnetic passcard each time the passcard is authenticated, and the fingerprint data transmitted to the network by the user is intercepted, there is only a fifty percent chance that the intercepted data will be useable when the network authenticates the passcard during any subsequent access attempt. Of course, the greater the number of fingerprints that can be selected for authentication purposes, the greater the security.

For still greater security, the selection command which is transmitted from the network to the user may be scrambled or encrypted to make it difficult, if not impossible, for a third party who intercepts the selection command from ascertaining the portion or portions of the user's magnetic medium for which remanent noise data will be transmitted. Similarly, the fingerprint data can be scrambled or encrypted prior to transmission. These approaches, in combination with any and all of the approaches discussed above, will further frustrate any attempt by a third party to accumulate, over time, the remanent noise data for substantial portions of a user's magnetic data card or other medium.

Where the magnetic data card is the well-known credit card, the present invention suggests two secure methodologies for authenticating a credit card before a particular transaction is cleared. The fingerprint data prerecorded on the credit card can be used for point-of-processing authentication where the credit card is physically presented to a retailer by the credit card holder for payment of a particular transaction. Alternatively, or where an individual is using its credit card remotely from the retailer, such as on-line or by telephone, the retailer can precondition its acceptance of payment by credit card upon the individual's ability to successfully provide fingerprint data for one or more portions of the magnetic stripe. By using these methodologies, the widespread, fraudulent use of stolen credit card numbers can be drastically reduced if not completely eliminated.

As mentioned above, the magnetic data card can also be provided with a second magnetic stripe to increase the number of fingerprints that can be obtained from the data card and stored. A portion of one or both of the magnetic stripes, including one or more of the multiple tracks, can be reserved for authentication purposes and possibly designated an authentication region, or an entire stripe can be so designated. Such a magnetic data card 215 having two magnetic stripes 216, 218 is shown in FIG. 23. Preferably, the first magnetic stripe 216 is used for recording standard types of data as is well-known in the art, while the second stripe 218 is reserved for determining remanent noise data therefrom for authentication purposes. Remanent noise data for one or both of the magnetic stripes 216, 218 can also be determined and recorded on one or both of the stripes, and/or in a database for subsequent use during a verification process.

Figure 24:
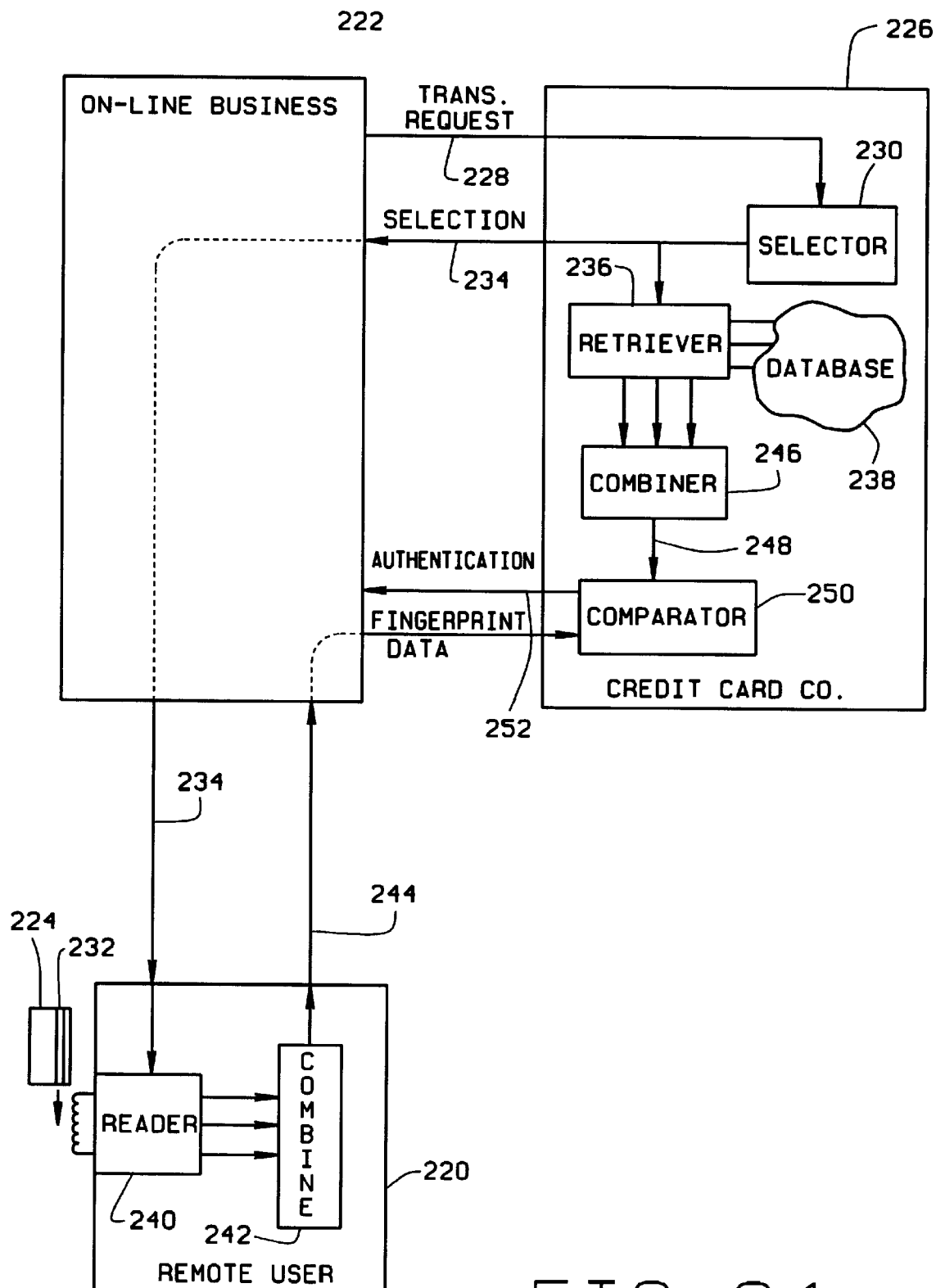
FIG. 24 is a block diagram of one implementation of the present invention for remotely authenticating credit cards to facilitate secure on-line credit card transactions.

FIG. 24 illustrates one implementation of the teachings of the present invention for the case of credit card transactions. When a remote user 220 seeks to purchase goods or services from an on-line business 222 using a credit card 224, the on-line business 222 will first verify that the remote user 220 possesses the credit card 224, and verify that the credit card is in good standing, by contacting the user's credit card company 226. The on-line business 222 will initiate this transaction by sending a transaction request 228 to the credit card company which provides information about the remote user such as the user's name, credit card number, etc. This information provided in the transaction request 228 will then be provided to a selector 230 for selecting one or more portions of the magnetic stripe 232 of the credit card 224 for authentication purposes. The selector outputs a selection signal 234 which is provided to the remote user via the on-line business 222, and which is provided to a retriever 236 for retrieving remanent noise data previously determined for the selected portion of the magnetic stripe from a database 238. Meanwhile, the remote user processes the selection signal 234 and determines the remanent noise for the selected portion of the magnetic stripe using a reader 240. Where multiple portions of the magnetic stripe are specified by the selection signal 234, and are to be used to generate a hybrid fingerprint as discussed above, the output of the reader 240 is provided to a combiner 242 for performing this process. The combiner 242 then provides hybrid fingerprint data 244 to the on-line business 222 which, in turn, provides this data to the credit card company 226. Similarly, the credit card company processes the remanent noise data previously determined for the selected portions of the magnetic stripe with a combiner 246 that employs the same algorithm as combiner 242, and outputs a hybrid fingerprint data signal 248 to a comparator 250. The comparator 250 compares the fingerprint data provided by the remote user to the fingerprint data obtained from the database 238 and, if these data correlate, provides an authentication signal 252 to the on-line business 222 indicating that the credit card 224 is, in fact, authentic.

In all of the examples disclosed above and below, the functions performed by the network or on-line business, the central database, and the remote individual or user, including generation of the selection command, determination of fingerprint data, retrieval of the stored remanent noise data, and correlation of the measured fingerprints with the stored fingerprints, can all be performed with appropriate computer systems and conventional magnetic transducers. It is a matter of routine skill to implement the teachings of the present invention using a conventional computer system and appropriate software.

In the case of passcards for accessing secure computer systems or databases, the passcard could be a diskette, where the system includes a database of remanent noise data previously determined for multiple portions of the diskette. Alternatively, the passcard may be a magnetic data card, and may even be a dual purpose passcard/credit card.

Just as a computer diskette can be used as a passcard, as described above, a hardware or software manufacturer that commercially distributes computer software can store remanent noise data for multiple portions of a floppy diskette before selling or otherwise distributing the diskette to the public. Thereafter, if an alleged purchaser of the software seeks technical support from the software manufacturer, the software manufacturer can request the remanent noise data for one or more portions of the purchased diskette to verify that the diskette is the authentic, originally purchased diskette. To facilitate this process, the software manufacturer may first request a serial number or other indicia for the diskette which the manufacturer can use to index a central database and retrieve the remanent noise data previously determined for that diskette. The purchased diskette will preferably include software for measuring the remanent noise at any selected portion of the diskette. If the remanent noise measured and transmitted by the purchaser correlates with the remanent noise data retrieved by the manufacturer, the diskette is declared authentic. Alternatively, the previously determined remanent noise data can be encrypted and stored on the diskette. During the authentication process, the user's computer can transmit the remanent noise measured for a portion of the diskette selected by the manufacturer, along with the encrypted data corresponding to the selected portion. The manufacturer can then decrypt the stored data and compare it with the measured remanent noise to verify that the diskette is authentic. Either of these methods for remotely authenticating the diskette by a software manufacturer can be performed on-line in the same manner as discussed above with respect to magnetic data cards.

Where an alleged purchaser seeks technical support by phone, the software manufacturer can first request the alleged purchaser to provide the remanent noise code for a specific portion of the disk, such as "RQ5." The purchaser can then type "RQ5" into its computer, and the authentication software provided with the purchased diskette can translate this request and determine the remanent noise for a particular portion of the diskette, and then provide a human readable code representative of the determined remanent noise on the computer monitor. The purchaser can then read the human readable code over the telephone to the software manufacturer so the manufacturer can compare this code to the previously determined remanent noise to thereby authenticate the purchaser's diskette before technical support is rendered. The next time the purchaser seeks technical support, a different or additional portion of the diskette can be selected for authentication purposes. Thus, the human readable code can be changed each time the purchaser seeks technical support. In this manner, software manufacturers can limit their expenses for providing technical support to the actual purchasers of their software, or at least to individuals who physically possess a purchased diskette. While this embodiment and many other embodiments of the subject invention have been described with reference to particular types of magnetic media such as diskettes, tapes, credit cards, passcards, etc., it should be understood that these embodiments are equally applicable to the other types of magnetic media described herein, as well as any other type of magnetic medium which serves the same or similar purpose. For example, in the case of technical support rendered by software manufacturers, the software may instead be provided on a digital tape, for example, and the same methodologies described above can be employed for authenticating the tape before technical support is rendered. The present invention can also be extended to objects which do not originally comprise a magnetic medium by permanently attaching a magnetic medium, such as a magnetic label, to the object for implementing any and all of the embodiments discussed above. For example, a cellular phone could be provided with a magnetic label or some other magnetic medium for remotely authenticating the phone and for preventing use of any illegal clones thereof.

There are various changes and modifications which may be made to the invention as would be apparent to those skilled in the art. However, these changes or modifications are included in the teaching of the disclosure, and it is intended that the invention be limited only by the scope of the claims appended hereto, and their equivalents.

What is claimed is:

1. A method for fingerprinting an object, the object including at least in part a magnetic medium, the method comprising the steps of determining a plurality of fingerprints, each of the plurality of fingerprints representing a remanent noise for a portion of the object's magnetic medium, and recording the plurality of fingerprints for use when later verifying the object's identity.

2. The method of claim 1 wherein the determining step includes determining the plurality of fingerprints as representing remanent noises for adjacent portions of the object's magnetic medium.

3. The method of claim 1 wherein the recording step includes recording the plurality of fingerprints in a database.

4. The method of claim 3 further comprising the step of encrypting the plurality of fingerprints.

5. A method for fingerprinting an object to facilitate a later verification of the object's identity, the object including at least in part a magnetic medium, the magnetic medium having at least one region having a plurality of unique fingerprints, the method comprising the steps of determining a remanent noise for the entirety of the magnetic medium region, the remanent noise comprising the plurality of unique fingerprints, and recording the remanent noise.

6. The method of claim 5 wherein the recording step includes recording the remanent noise in a database.

7. A device for fingerprinting an object for the later verification of the object's identity, the object including at least in part a magnetic medium, the device comprising a reader for determining a plurality of fingerprints, each of the plurality of fingerprints representing a remanent noise for a portion of the object's magnetic medium, and a recorder for recording the plurality of fingerprints.

8. The device of claim 7 wherein the reader is configured for determining the plurality of fingerprints from discontiguous portions of the object's magnetic medium.

9. The device of claim 7 wherein the recorder is configured for recording the plurality of fingerprints in a database.

10. The device of claim 9 further comprising an encryptor for encrypting the plurality of fingerprints.

11. A device for fingerprinting an object to facilitate a later verification of the object's identity, the object including at least in part a magnetic medium, the magnetic medium having at least one region having a plurality of unique fingerprints, the device comprising a reader for determining a remanent noise for the entirety of the magnetic medium region, the remanent noise comprising the plurality of unique fingerprints, and a recorder for recording the remanent noise.

12. The device of claim 11 wherein the recorder is configured for recording the remanent noise in a database.

13. A method for authenticating an object, the object including at least in part a magnetic medium, the method comprising the steps of selecting at least one portion of the magnetic medium which is not reliably the same portion selected in a most recent previous selection, obtaining remanent noise data from the selected portion, and comparing the remanent noise data obtained from the selected portion with a previous determination thereof to thereby determine whether the object is authentic.

14. The method of claim 13 wherein the selecting step includes selecting a plurality of portions of the magnetic medium, the obtaining step includes obtaining remanent noise data from the plurality of selected portions, and the comparing step includes comparing the remanent noise data obtained from the plurality of selected portions with a previous determination thereof to thereby determine whether the object is authentic.

15. The method of claim 14 wherein the selecting step includes selecting at least two overlapping portions of the magnetic medium.

16. The method of claim 14 wherein the selecting step includes selecting at least two portions of the magnetic medium having unequal read lengths.

17. The method of claim 14 further comprising the steps of linearly combining the remanent noise data obtained from the plurality of selected portions and linearly combining the remanent noise data previously determined for the plurality of selected portions, wherein the comparing step includes comparing the linear combinations to thereby determine whether the object is authentic.

18. The method of claim 13 further comprising the step of retrieving the remanent noise data previously determined for the selected portion from a database.

19. The method of claim 13 wherein the selecting step includes randomly selecting the at least one portion of the magnetic medium.

20. The method of claim 13 wherein the selecting step includes reliably selecting at least one different portion of the magnetic medium each time the object is authenticated.

21. A method for authenticating an object physically remote from a central location by transmitting data between the physically remote object and the central location over a data link, the physically remote object including a magnetic medium, the method comprising the steps of sending over the data link sufficient data for selecting at least one portion of the object's magnetic medium, receiving remanent noise data obtained from the selected portion, and comparing at the central location the received remanent noise data with a previous determination thereof to thereby remotely determine whether the physically remote object is authentic.

22. The method of claim 21 wherein the sending step includes sending sufficient data for selecting the at least one portion of the object's magnetic medium as a portion that is not reliably the same portion selected in a most recent previous selection.

23. The method of claim 22 wherein the sending step includes sending sufficient data for randomly selecting the at least one portion of the magnetic medium.

24. The method of claim 21 wherein the sending step includes sending sufficient data for selecting a plurality of portions of the object's magnetic medium, the receiving step includes receiving remanent noise data obtained from the plurality of selected portions, and the comparing step includes comparing the received remanent noise data with a previous determination thereof.

25. The method of claim 24 further comprising the step of linearly combining the remanent noise data previously determined for the plurality of selected portions, wherein the receiving step includes receiving a linear combination of the remanent noise data obtained from the plurality of selected portions, and the comparing step includes comparing the linear combinations to thereby determine whether the physically remote object is authentic.

26. The method of claim 21 wherein the sending step includes sending sufficient data for selecting at least one different portion of the magnetic medium a next time the object is authenticated.

27. The method of claim 21 further comprising the step of retrieving the remanent noise data previously determined for the selected portion from a database.

28. A device for authenticating a physically remote object, the object including at least in part a magnetic medium, the device comprising a selector for selecting at least one portion of the magnetic medium which is not reliably the same portion selected in a most recent previous selection, an input for receiving remanent noise data obtained from the selected portion, and a comparator for comparing the received remanent noise data with a previous determination thereof to thereby determine whether the physically remote object is authentic.

29. The device of claim 28 wherein the selector is configured for selecting a plurality of portions of the object's magnetic medium, the input is adapted to receiving remanent noise data obtained from the plurality of selected portions, and the comparator is configured for comparing the received remanent noise data with a previous determination thereof to thereby determine whether the physically remote object is authentic.

30. The device of claim 29 wherein the selector is configured for selecting at least two overlapping portions of the magnetic medium.

31. The device of claim 29 wherein the selector is configured for selecting at least two portions of the magnetic medium having unequal surface areas.

32. The device of claim 29 wherein the received remanent noise data is a linear combination of the remanent noise data obtained from the plurality of selected portions, the device further comprising a combiner for linearly combining the remanent noise data previously determined for the plurality of selected portions, the comparator being configured for comparing the linear combinations to thereby determine whether the physically remote object is authentic.

33. The device of claim 28 further comprising a retriever for retrieving the remanent noise data previously determined for the selected portion from a database.

34. A device for facilitating authentication of an object by a physically remote entity, the object including at least in part a magnetic medium, the device comprising an input for receiving a selection of at least one portion of the magnetic medium, a reader for determining a remanent noise from the selected portion of the magnetic medium, and an output for providing data representative of the determined remanent noise.

35. The device of claim 34 wherein the input comprises a keyboard for entering the selection of the at least one portion of the magnetic medium.

36. The device of claim 35 wherein the output comprises a monitor for displaying the data representative of the determined remanent noise.

37. The device of claim 34 wherein the input and the output comprise a modem for receiving the selection and for transmitting the data representative of the determined remanent noise.

38. The device of claim 34 wherein the input is configured for receiving a selection of a plurality of portions of the magnetic medium, the reader is configured for determining a remanent noise from each of the plurality of selected portions, and the output is configured for providing data representative of the determined remanent noises.

39. The device of claim 38 further comprising a combiner for producing a linear combination of the determined remanent noises, the output being configured for providing data representative of the linear combination.

40. The device of claim 38 wherein the input is configured for receiving a selection of a plurality of overlapping portions of the magnetic medium and the reader is configured for determining a remanent noise from each of the plurality of overlapping portions.

41. The device of claim 38 wherein the input is configured for receiving a selection of a plurality of portions of the magnetic medium having unequal surface areas and the reader is configured for determining a remanent noise from the plurality of selected portions having unequal surface areas.

42. The method of claim 13 wherein the selecting step includes selecting a portion of the magnetic medium from which a plurality of unique fingerprints can be determined, the obtaining step includes obtaining remanent noise data from said selected portion, and the comparing step includes comparing at least a portion of the remanent noise data obtained from said selected portion with a previous determination thereof.

43. The method of claim 22 wherein the sending step includes sending sufficient data for selecting a portion of the object's magnetic medium from which a plurality of unique fingerprints can be determined, the receiving step includes receiving remanent noise data obtained from said selected portion, and the comparing step includes comparing at least a portion of the received remanent noise data with a previous determination thereof.

44. The device of claim 29 wherein the selector is configured for selecting a portion of the magnetic medium from which a plurality of unique fingerprints can be determined, the input is adapted to receiving remanent noise data obtained from said selected portion, and the comparator is configured for comparing at least a portion of the received remanent noise data with a previous determination thereof.

* * * * *